(12) United States Patent
Megy

(10) Patent No.: US 8,734,749 B2
(45) Date of Patent: May 27, 2014

(54) PHOSPHOROUS PENTOXIDE PRODUCING METHODS AND PHOSPHATE ORE FEED AGGLOMERATES

(75) Inventor: Joseph A. Megy, Richland, WA (US)

(73) Assignee: JDCPhosphate, Inc., Fort Meade, FL (US)

( * ) Notice: Subject to any disclaimer, the term of this patent is extended or adjusted under 35 U.S.C. 154(b) by 0 days.

(21) Appl. No.: 13/306,890

(22) Filed: Nov. 29, 2011

(65) Prior Publication Data
US 2013/0136682 A1 May 30, 2013

(51) Int. Cl.
*C01B 25/12* (2006.01)

(52) U.S. Cl.
CPC ...................................... *C01B 25/12* (2013.01)
USPC ........................................................ 423/304

(58) Field of Classification Search
USPC .................... 423/304; 23/313 R; 75/746, 762
See application file for complete search history.

(56) References Cited

U.S. PATENT DOCUMENTS

| | | |
|---|---|---|
| 2,075,212 A | 3/1937 | Levermore |
| 3,235,330 A | 2/1966 | Lapple |
| 3,241,917 A | 3/1966 | Lapple |
| 3,341,289 A | 9/1967 | Hendrickson |
| 3,558,114 A | 1/1971 | Saeman |
| 3,591,336 A | 7/1971 | Saeman |
| 3,598,315 A | 8/1971 | Seymour |
| 3,760,048 A | 9/1973 | Sullivan et al. |
| 3,923,961 A | 12/1975 | Dancy |
| 4,014,682 A | 3/1977 | Majewski |
| 4,263,262 A | 4/1981 | Jukkola |
| 4,321,238 A | 3/1982 | Henin |
| 4,351,809 A | 9/1982 | Megy et al. |
| 4,351,813 A | 9/1982 | Megy et al. |
| 4,372,929 A | 2/1983 | Barber |
| 4,383,847 A | 5/1983 | Barber |
| 4,389,384 A | 6/1983 | Hard |
| 4,397,826 A | 8/1983 | Hard et al. |

(Continued)

FOREIGN PATENT DOCUMENTS

| | | |
|---|---|---|
| CN | 1562847 A | 1/2005 |
| CN | 1837129 A | 9/2006 |

(Continued)

OTHER PUBLICATIONS

JDCPHOSPHATE, Newsletter, Winter 2011, vol. 1, Issue 1, 5 pages.

(Continued)

*Primary Examiner* — Steven Bos
*Assistant Examiner* — Justin Bova
(74) *Attorney, Agent, or Firm* — Parsons Behle & Latimer

(57) ABSTRACT

A phosphorous pentoxide producing method includes forming a reducing kiln bed using feed agglomerates containing a lignin sulfonate both inside the agglomerates and coating a surface of individual agglomerates. Freeboard particulates are generated from the agglomerates, an amount of particulates generated being less than would occur in the method with no lignin sulfonate. Kiln off gas is generated and phosphorous pentoxide is collected from the kiln off gas. The kiln discharges a residue containing processed agglomerates, less than 20% of the agglomerates' phosphate input to the kiln remaining in the residue. The percentage of input phosphate that remains in the residue is less than would occur in the method with no lignin sulfonate. The method may include forming green agglomerates. Controlling a drying rate of the green agglomerates may wick some of the lignin sulfonate onto the surface of individual drying agglomerates without adhering the agglomerates together.

21 Claims, 3 Drawing Sheets

(56) References Cited

U.S. PATENT DOCUMENTS

| | | | |
|---|---|---|---|
| 4,420,466 | A | 12/1983 | Park et al. |
| 4,421,521 | A | 12/1983 | Barber |
| 4,451,277 | A | 5/1984 | Barber |
| 4,514,366 | A | 4/1985 | Barber |
| 4,537,615 | A | 8/1985 | Barber |
| 4,603,039 | A | 7/1986 | Kuxdorf |
| 4,608,241 | A | 8/1986 | Barber |
| 4,649,035 | A | 3/1987 | Barber |
| 4,656,020 | A | 4/1987 | Barber |
| 4,774,064 | A | 9/1988 | Arnold |
| 4,919,906 | A | 4/1990 | Barber |
| 5,100,314 | A | 3/1992 | Rierson et al. |
| 5,228,895 | A | 7/1993 | Kelly |
| 5,572,938 | A | 11/1996 | Leger |
| 5,743,934 | A | 4/1998 | Wommack |
| 6,342,089 | B1 | 1/2002 | McGaa |
| 6,921,520 | B2 | 7/2005 | Barber |
| 6,932,002 | B2 | 8/2005 | May |
| 7,378,070 | B2 | 5/2008 | Megy |
| 2004/0067187 | A1 | 4/2004 | Barber |
| 2004/0109809 | A1 | 6/2004 | Hokanson |
| 2005/0002845 | A1 | 1/2005 | Hokanson |
| 2008/0289385 | A1* | 11/2008 | Megy ................ 71/33 |

FOREIGN PATENT DOCUMENTS

| | | |
|---|---|---|
| CN | WO2008043222 A1 | 4/2008 |
| JP | 2185930 A | 7/1990 |
| SU | 976245 | 11/1982 |
| SU | 1370073 A1 | 1/1988 |
| WO | WO2004052938 A2 | 6/2004 |
| WO | PCT/US2005019598 | 6/2005 |
| WO | WO2005118468 A2 | 6/2005 |

OTHER PUBLICATIONS

Kawatra, et al., Novel Binders and Methods for Agglomeration of Ore, Apr. 2004, Michigan Technological University Department of Chemical Engineering, Houghton, Michigan, 29 pages.

Yamada, Alan, Dust Suppressants for Temporary Helicopter Landing Areas, Dec. 1998, United States Department of Agriculture Forest Service, 4 pages.

Perry's Chemical Engineers' Handbook, 1984, Sixth Edition, pp. 19-35 through 19-40, McGraw-Hill Book Company.

Rierson, David W. "Ilmenite Direct Reduction Project in Norway Using the GRATE-CAR™ Process" AIME Conference, 1992.

Paul, et al. "Desulfurizaton of Petroleum Coke Beyond 1600° C." Light Metals 2001, The Minderals, Metals & Materials Society, 2001.

Jacob, K.D., et al.,"Reduction of Tricalcium Phosphate by Carbon" Industrial & Engineering Chemistry, Nov. 1929, 21 (11), pp. 1126-1132.

Mu, "Reduction of Phosphate Ores by Carbon: Part 1, Process Variables for Design for Rotary Kiln System" Metallurgical Transactions B, vol. 17B, Dec. 1986, pp. 861-868.

Ni et al., "Preparation of high-concentration phosphoric acid by direct reduction of middle/low grade phosphorite" Abstract of CN 101125646 A, Feb. 20, 2008, Chem. Abstr., 2008, 1 page, 148:358299.

Zhang, Dingbin et al., "Industrial vertical flame-isolating kiln for preparing yellow phosphorus or phosphoric acid from phosphorus ores" Abstract of CN 101298959 A, Nov. 5, 2008, Chem. Abstr., 2008, 1 page, 149:536540.

Zhang, Dingbin etal., "A method for manufacturing phosphoric acid and construction bricks from phosphorus—containing tailings obtained in phosphorite beneficiation" Abstract of CN 1837129 A, Sep. 27, 2006, Chem. Abstr., 2007, 1 page, 145:424251.

Megy, Joseph A., "Rotary kiln process for phosphoric acid manufacture" Abstract of WO 205118468, Dec. 15, 2005, Chem. Abstr., 2007, 1 page, 144:24490.

Qiu, Liyou et al., "Study on operation temperature range of rotary kiln in KPA process" Abstract of Huaxue Fanying Gongcheng Yu Gongyi, 11(2), 203-7 (Chinese), 1995, Chem. Abstr., 1997, 1 page, 123:203622.

Qiu, Liyou et al, "Study on kiln gas production in rotary kiln for the KPA process" Abstract of Huaxue Fanying Gongcheng Yu Gongyi, 9(1), 90-7 (Chinese), 1993, Chem. Abstr., 1997, 1 page, 120:110744.

Zhantasov, K. T. el al., "Pelletization of phosphate-siliceous ore fines in a rotary kiln" Abstract of Kompleksn. Ispol'z. Miner. Syr'ya, (11), 27-30 (Russian) 1987, Chem. Abstr., 1997, 1 page, 108:97143.

Yang, Shimo, "Production of phosphoric acid by combustion of lean phosphorus mud in rotary kiln" Abstract of CN 85104782A, Dec. 10, 1986, Chem. Abstr., 1997, 1 page, 108:8278.

Misao, Masahiro et al., "Reduction of ore pellets in rotary kiln" Abstract of JP02185930A2, Jul. 20, 1990, Chem. Abstr., 1997, 1 page, 114:251117.

Leder, Frederic et al., "New Process for Technical-Grade Phosphoric Acid", Ind. Eng. Chem. Process Des. Dev. 1985, 24, 688-697.

* cited by examiner

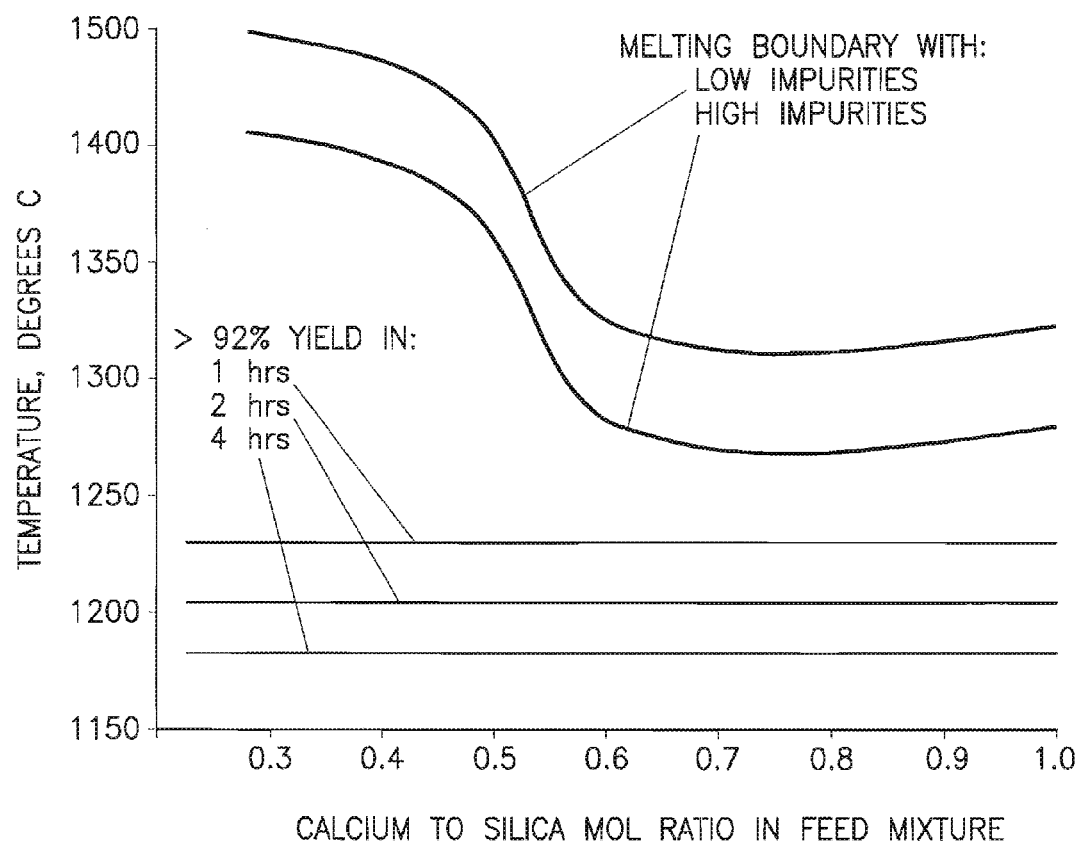

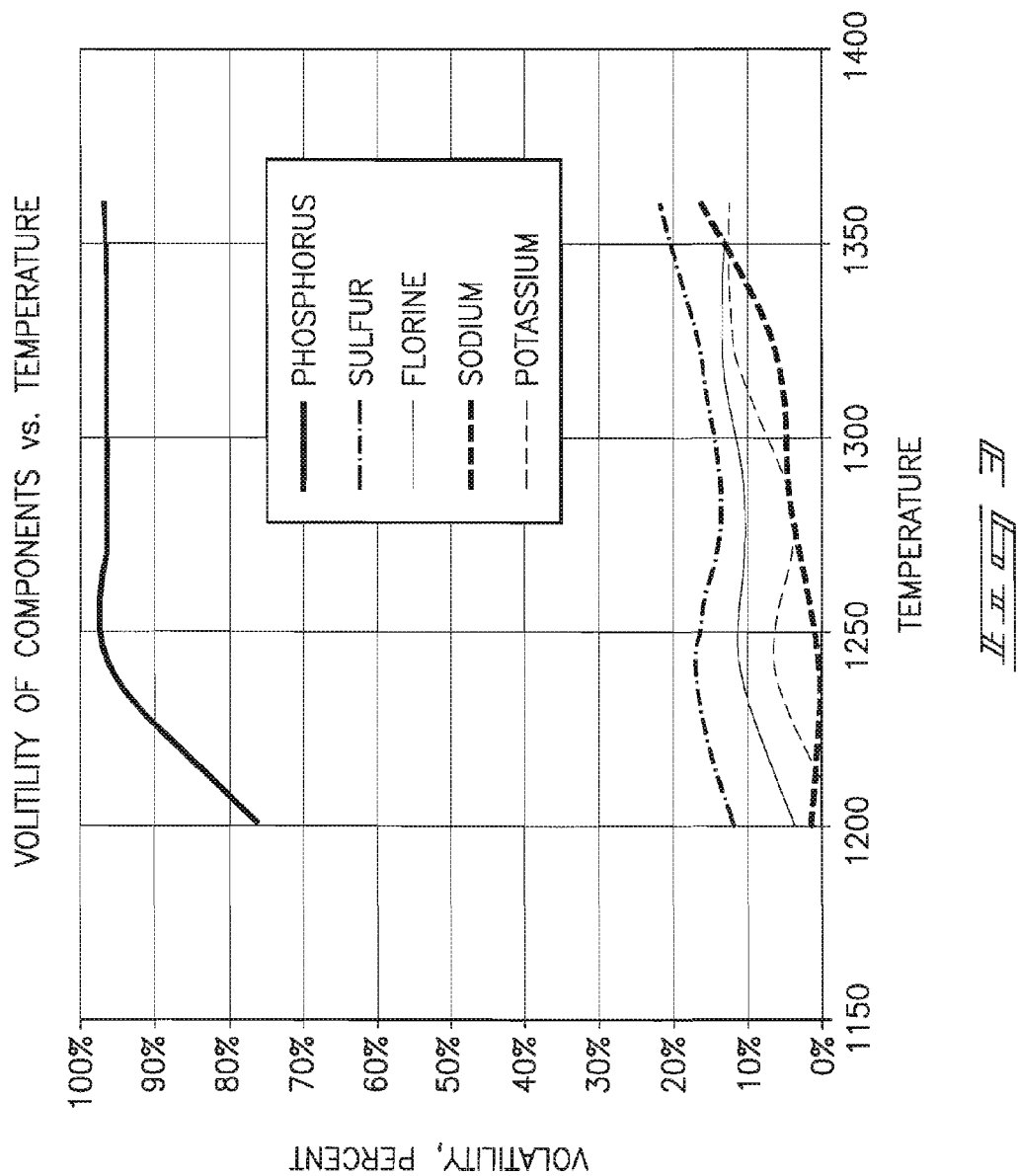

PHOSPHOROUS PENTOXIDE PRODUCING METHODS AND PHOSPHATE ORE FEED AGGLOMERATES

TECHNICAL FIELD

The invention pertains to methods for producing phosphorous pentoxide performed in counter-current rotary kilns and phosphate ore feed agglomerates for use in such kilns.

BACKGROUND

One known method for producing phosphorous pentoxide ($P_2O_5$, usually present as the dimer $P_4O_{10}$ in the gas phase) involves processing raw material agglomerates containing phosphate ore, silica, and coke in the bed of a rotary kiln to chemically reduce the phosphate ore and generate gaseous phosphorus metal ($P_4$) and carbon monoxide (CO) off gas to the kiln freeboard where they are burned (oxidized) with air to provide heat for the process. It may be referred to as the kiln phosphoric acid (KPA) process. The oxidized phosphorus metal is a phosphorus oxide (normally, $P_4O_{10}$), which can be scrubbed from the kiln off gases with a phosphoric acid ($H_3PO_4$) solution and water to make a suitable phosphoric acid product.

KPA process chemistry is similar to another process known as the furnace acid process for manufacture of phosphoric acid. In the furnace process, the raw materials are heated and partially melted. An endothermic reduction reaction is carried out in one vessel called the electric furnace where the heat is supplied by the use of electric resistance heating in the bed. The phosphorus metal is recovered from the off gas of the furnace with cold water sprays as liquid phosphorus metal which can be transported to another vessel called the burner where it generates considerable heat while being burned with air. The resulting phosphorus oxide is absorbed in water to make a concentrated, high purity phosphoric acid.

The electric furnace in the furnace process does not use the heat generated from burning phosphorus metal that arises in the burner vessel. Also, the electric furnace does not use heat from burning the carbon monoxide that it generates. Although widely used in the last century for producing phosphoric acid, the cost of electricity as compared to the cost of sulfuric acid resulted in shutdown of most of the furnace acid plants in favor of another process known as the sulfuric acid process for making phosphoric acid.

If the heat generated in burning the off gasses from the furnace process reduction reaction could be utilized to provide the heat requirements of the reduction process, thereby replacing electrical heating, then economies might be realized. Converting the furnace process carbon reductant to carbon dioxide might generate sufficient heat, if used efficiently, to replace all the heat added by electricity in the furnace process. A vision of such potential motivated many researchers over the years to develop concepts where heat integration could be realized. The following references describe the various attempts: Levermore (U.S. Pat. No. 2,075,212), Lapple (U.S. Pat. Nos. 3,235,330 and 3,241,917), Saeman (U.S. Pat. No. 3,558,114), Megy (U.S. Pat. Nos. 4,351,809 and 4,351,813), Hard (U.S. Pat. Nos. 4,389,384), and Park (U.S. Pat. No. 4,420,466). All of the described processes use a rotary kiln with a reducing bed and an oxidizing freeboard and are collectively within the realm of KPA processes.

A kiln within a kiln concept forwarded in the Levermore patent addressed the heat integration issue in a reasonable conceptual way, but was not practical because no material of construction for the inner kiln was available. The Levermore process heated up the agglomerated solids containing phosphate ore, silica, and carbonaceous material and conducted the endothermic reduction reaction in an inner kiln held inside an outer kiln. The $P_4$ and CO off gases from the reduction reaction in the inner kiln passed between the outside wall of the inner kiln and the inner wall of the outer kiln, where air was admitted to oxidize the $P_4$ and CO, generating sufficient heat to supply the requirements of the inner kiln. The heat then passed through the outside wall of the inner kiln.

The Lapple and Megy patents recognized that a separate oxidizing freeboard and reducing bed could be maintained in a kiln without a separating wall, but failed because of melting problems during the phosphate reduction reaction. Lapple and Megy specify a calcium-to-silica mole ratio in the feed to the kiln greater than 1.0.

The Park patent describes a process requiring ore with less silica than is cheaply available and a very hot kiln operation that has not appeared attractive enough to encourage commercialization to date.

The process in the Saeman patent involves carrying out the rotary kiln reduction reaction in a molten slurry, contained within the shell of the kiln protected by freezing a layer of solids on the inside of the kiln wall. This process has been abandoned.

The process in the Hard patent showed promise and a continuous pilot plant based on a 33 inch diameter by 30 feet long kiln was operated under the direction of the present inventor in the early 1980's. The results were published in Leder, et al., *A New Process for Technical Grade Phosphoric Acid*, Ind. Eng. Chem. Process Des. Dev., 1985, 24, 888-897, but the process was abandoned as his teachings were not complete enough to show how to carry out an economically feasible commercial process. The pilot plant yields were low, with a maximum yield of 72% when run in a commercial mode without bedding coke, and 86% when a large amount of bedding coke was used.

Other problems included: 1) throughput rates that were low which indicated a high capital cost requirement for the process, 2) high temperature of operation (greater than 1435° C.) to reach high yields, which put the operation close to melting problems and required higher silica admixtures in the kiln feed than desired for commercial operation, and 3) high maintenance problems. The high temperature and partial oxidation of carbon from the kiln solids resulted in transfer of significant amounts of fluorine, sodium, potassium, and sulfur to the kiln off gas, producing deposits in the back end of the kiln and off gas lines, contamination of the product acid, and extra costs associated in scrubbing acidic gases from the process. The off gases from the process were chemically reducing, requiring the added cost of an after burner. Significant generation of dust was dealt with using dust collection devices and kiln ringing from the dust also occurred. The combination of these problems was such that no one has attempted to commercialize the Hard process even though it has now been over twenty years since the pilot plant was operated.

U.S. Pat. Nos. 7,378,070 and 7,910,080 were issued to the present inventor for a new process called the Improved Hard Process (IHP). A number of process benefits allowed the IHP to be run with an increased level of phosphate ore in the feed, at 120° C. lower operating temperature, at higher yields due to avoidance of a competing reaction that was operable in the Hard process, and with a fivefold increase in kiln phosphorus output for a given size kiln. These process benefits resulted in breakthrough economic projections, justifying a commercial demonstration plant. The IHP considerably benefited the capital and operating cost of running a KPA process.

However, as may be appreciated from the previous difficulties described above, the KPA process and/or IHP may be improved further.

BRIEF DESCRIPTION OF THE DRAWINGS

Preferred embodiments of the invention are described below with reference to the following accompanying drawings.

FIG. 2 is a chart pertaining to IHP Example 1 showing melting temperatures with respect to calcium-to-silica mole ratio and showing the temperatures for greater than 92% yield in 1, 2, and 4 hours with respect to calcium-to-silica mole ratio.

FIG. 3 is a chart showing volatility for various elements with respect to temperature.

DETAILED DESCRIPTION OF THE PREFERRED EMBODIMENTS

Figure 1:
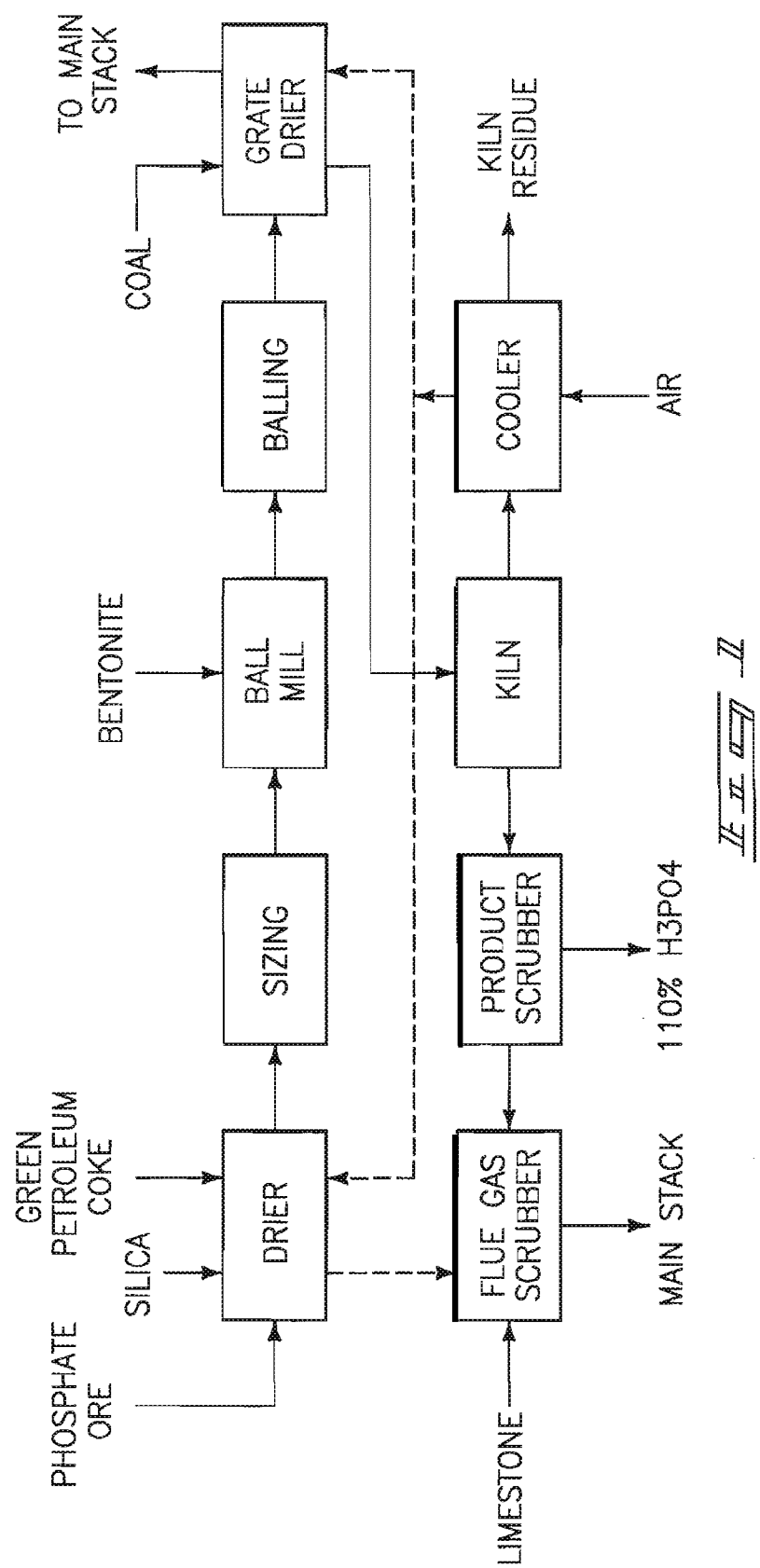
FIG. 1 is a block diagram of the IHP.

A further benefit, which is the subject of the present document, involves a new method of providing a carbonaceous coating on the kiln feed ball and a new feed ball so-coated, which have far reaching positive effects on the Improved Hard Process (IHP). Details of the IHP applicable to the embodiments herein are discussed in the section below entitled "Improved Hard Process" and are provided for the reader to understand with greater depth the processes in which the embodiments herein operate.

Although the IHP provided increased yield over the Hard process and other KPA processes, additional improvement was possible. Carbon burnout represents a significant factor in yield losses for the Hard process, particularly in small kilns, given their small diameter, as explained below. Observation indicated that providing a carbonaceous coating on feed balls that persisted during appropriate periods of bed heat up provided measurable increases in yield by further guarding against carbon burnout.

The inclusion of lignin sulfonate in feed balls during ball formation was found to produce such a coating. Essentially, suitable amounts of lignin sulfonate blended with the raw materials for the balls were observed to pass, in part, to the ball surface during the drying process. Without being limited to a particular theory, a wicking mechanism enabled by the nature of the drying process is believed to allow formation of the coating. As water moves through the ball to the surface to evaporate during drying with hot air, lignin sulfonate dissolved into the moving water may remain behind on the surface after the water evaporates. The result is a ball with a tough, leather-like carbon surface that could also be considered akin to a modestly hard rubber.

As the coated ball heats in the kiln, volatiles evolve from the ball, blanketing the ball and reducing ingress of $P_4O_{10}$ to the ball which, if it arrives at the ball surface, is believed to back react and form calcium pyrophosphate. The pyrophosphate would then apparently undergo reduction when the ball reaches reduction temperature, reducing yield, as described further below. Also, without volatiles blanketing an uncoated ball as the ball heats, the carbon burns out of a shell at the ball surface by oxidation with freeboard gases. Since the carbon is not available in the burned out shell, fluorapatite will not be chemically reduced there.

In comparison to balls lacking lignin sulfonate, testing showed that the overall chemical reduction yield for balls containing lignin sulfonate incrementally increased. Therefore, the testing is believed to support the described theoretical mechanism even though not confirmed by composition analysis of balls from the bed heat up period.

Notably, volatiles from the lignin sulfonate evolve at a comparably low temperature, much of them between the kiln entering temperature of 120° C. and the onset of volatiles from green petroleum coke in the feed balls at 650° C. Beneficially, the lignin sulfonate volatiles evolve just when they are of greatest benefit, during bed heat up before other volatiles evolve from other materials. The Megy IHP patents describe using small additions of coal added among the feed balls as "bedding," which also have low temperature volatiles to achieve this purpose. However, the lignin sulfonate provides additional benefits.

The fixed carbon component of the lignin sulfonate coating may stay behind between 650° C. and the onset of reduction at 1180° C. In this regard, it forms a sacrificial layer of carbon right where it is of greatest benefit to protect the balls from carbon burnout and thereby to increase yield. A batch kiln used in testing represents a severe case of the carbon burnout due to high turbulence therein. In such case, the lignin sulfonate provided a clear benefit. As the process is scaled up in a larger, continuous kiln, an expectation exists that carbon burnout will decrease so that the incremental yield increase might not be so stark. Nevertheless, even a small yield increase may benefit process economics.

Perhaps the greatest and most surprising benefit is the suppression of dusting during the maximum dusting time in the heat up period. Measured dust levels were less than other tests using like feed balls without lignin sulfonate additions. The dust levels, though small, in a commercial, countercurrent kiln may lead directly to kiln wall deposits. Reduction in dust level also increases the purity of the phosphoric acid product and further reduces wall accretions; a very significant benefit.

As tangential benefit, the lignin sulfonate does not detract from a ball strength specification. For this metric, balls containing lignin sulfonate were generally incrementally superior to balls containing only bentonite or clay as a binder. Accordingly, lignin sulfonate may replace at least part of the binder otherwise used. A residual of clay in the balls may be desirable as it supplies strength in balls after the carbon from the lignin sulfonate burns out and in the kiln residue from the process when used as a co-product aggregate. Since lignin sulfonate is a waste product, it may be acquired at low cost, but still represents an added cost, which is best to offset with benefits.

In an embodiment, a phosphorous pentoxide producing method includes forming a reducing kiln bed using feed agglomerates below an oxidizing freeboard of a countercurrent rotary kiln, the bed having a length. The agglomerates contain phosphate ore particles, carbonaceous material particles, sufficient silica particles for the agglomerates to exhibit a calcium plus magnesium-to-silica mole ratio of less than 1.0, and a lignin sulfonate both inside the agglomerates and coating a surface of individual agglomerates. In the IHP discussed below, the relevant ratio is described as calcium-to-silica. Often, calcium content in agglomerates is much more than magnesium, perhaps by a factor of 50 or so. However, in the interest of fine tuning the process and allowing applicability to high magnesium content ores, the ratio may be (moles of calcium+moles of magnesium)/moles of silica of less than 1.0 or perhaps lower, as discussed below.

While ratios between 1.0 and 0.5 can be run in the IHP with high purity ore and attention to the details of the IHP specifications, compositions in this range have a small temperature operating range prior to melting (see FIG. 2), with reduced throughput. When ratios below 0.5 are used, the ball becomes more resistant to melting as the calcium monosilicate product from the reduction reaction is formed into long glass-like chains with the addition of a second silica atom. Thus, more robust operation, with higher throughput and greater tolerance for impurities, is possible with ratios below 0.5.

The method includes maintaining a bed temperature at or above 1180° C. along a portion of the bed length. Freeboard particulates are generated from the agglomerates, an amount of particulates generated being less than would occur in the method with no lignin sulfonate. Kiln off gas is generated and phosphorous pentoxide is collected from the kiln off gas. The kiln discharges a residue containing processed agglomerates, less than 20% of the agglomerates' phosphate input to the kiln remaining in the residue. The percentage of input phosphate that remains in the residue is less than would occur in the method with no lignin sulfonate.

By way of example, less than 10% of the agglomerates' phosphate input to the kiln may remain in the residue. The calcium plus magnesium-to-silica mole ratio may be less than 0.5. The method may further include forming green feed agglomerates from a homogeneous blend of water, the lignin sulfonate, the phosphate ore particles, the carbonaceous material particles, and the silica particles. The green agglomerates may contain about 0.1 to 4 wt % lignin sulfonate on a dry basis, that is, not accounting for the presence of water. All compositions expressed herein for the feed agglomerates or feed balls are on a dry basis, unless otherwise indicated. Still further, the green agglomerates may contain about 0.4 to 2 wt % lignin sulfonate. The method may include controlling a drying rate of the green agglomerates and, as the water evaporates from the agglomerates, forming the lignin sulfonate coating on individual dried agglomerates by wicking some of the lignin sulfonate onto the surface of individual drying agglomerates without adhering the agglomerates together.

The carbonaceous material particles that chemically reduce the phosphate ore (not the lignin sulfonate) may contain about 8 to 12 wt % volatiles and at least 80% of all particles may exhibit a size less than 200 mesh. The lignin sulfonate coating may have a thickness of about 1 to 50 micrometers. Individual agglomerates may contain a total of about 0.1 to 4 wt % lignin sulfonate including the coating. Due to the wicking mechanism, the lignin sulfonate inside the agglomerates may exhibit a continuously decreasing concentration gradient of lignin sulfonate from the surface into individual agglomerates.

The method may further include volatilizing at least a portion of the lignin sulfonate coating during bed heat up from about 650 to about 1180° C. Also, the method may further include blanketing the bed with volatiles evolving at least partly from the lignin sulfonate during bed heat up from about 120 to about 650° C. and retaining a sacrificial layer of fixed carbon from the lignin sulfonate coating. In the circumstance where the sacrificial layer is retained past bed heat up to about 650° C., at least a portion of the sacrificial layer may be volatilized during further bed heat up from about 650 to about 1180° C. while volatiles from the carbonaceous material particles are also volatilizing.

In the IHP, the raw materials are co-ground in an open circuit ball mill to provide the 80%-200 mesh according to the methods described below. The open circuit ball mill grind gives a large proportion of the material in the 1 to 50 micrometer size range that would not be present if closed circuit grinding was used. The fineness of the carbon and the intimate mixture both contribute to the IHP kiln reaction going to high yield at 1180° C. With this level of super-fines in the mixture, U.S. Pat. Nos. 7,378,070 and 7,910,080 (the Megy IHP patents) teach that clay additions help to make sufficiently strong balls. Examples are about 0.7% of sodium modified bentonite, or 3% of phosphate clay normally associated with phosphate mining operations.

However, as described, use of lignin sulfonate in producing balls also shows that lignin sulfonate works well as a binder with about 1.0 wt % addition (dry basis). Unless otherwise indicated, reference herein to a content of lignin sulfonate is on a dry basis. Lignin sulfonate is available in a variety of forms, solid or liquid, including as an about 50 wt % viscous, aqueous solution obtainable as a waste product from the manufacture of paper by the sulfite industry. Accordingly, addition of about 2.0 wt % of a 50 wt % solution may provide the desired about 1.0 wt % of lignin sulfonate. Given that the liquid solution is an industrial product, actual content of lignin sulfonate may vary from lot to lot and the amount added to provide the desired content may vary. One example of such a product includes calcium lignin sulfonate available from ArrMaz Custom Chemicals in Mulberry, Fla. Several types of lignin sulfonate may be suitable, including ammonium lignin sulfonate, sodium lignin sulfonate, and calcium lignin sulfonate.

Drying the balls so as to create the mentioned wicking mechanism may result in the lignin sulfonate being deposited as an adherent tough skin on the outside of the feed balls. An example of a method of preparing the feed balls for the kiln is as follows.

The raw materials and a small amount of clay, as discussed above, are proportioned with weigh belt feeders into a drier. After drying the raw materials they are co-ground in an open circuit ball mill. After co-grinding, the raw materials are mixed with about 8 wt % water and 1.0 wt % lignin sulfonate is blended into the dry co-ground raw materials. The moistened, co-ground raw materials are then formed into balls, either on a balling pan or, beneficially, in a balling drum using procedures known in the iron ore pelletizing industry. For the balling drum, this involves a large recycle stream of the growing balls followed by a roller screen to select those balls that are on size. Although balls are described here, the embodiments may be applicable to other geometric shapes, if desired to meet a specification in a certain IHP process.

After suitably sized green balls are made, they are passed to a low temperature grate for drying, operating at a temperature of about 250° C. This can be accomplished by passing heated gases either up draft or down draft (or a combination) through a bed of balls, about 12 inches thick, on a moving porous belt, which generally dries the balls in about 10 minutes. It is during this step that the surprising action of the lignin sulfonate occurs. Decreasing the bed depth to about 6 inches may allow drying in less time. However, observation indicates that ball integrity may deteriorate if drying is too fast, for example, 5 minutes. Deterioration may be influenced by heat sensitivity of one or more components. The strength of the composition used for the green balls described herein allows the increased bed depth, and slower drying, without a concern that the stacking will damage the balls.

Drying temperature may be below about 400° C., at which temperature carbonaceous material in the balls may begin to oxidize (burn), or even less than about 350° C. to be safe. Also, the amount of clay, if included, may influence heat sensitivity. It is believed that too much clay closes pores in green balls such that steam fissures develop during rapid drying, weakening the balls. Balls may even explode as a result, if dried too fast. However, clay increases ball strength, so some clay content is desirable. Reducing ball size decreases the heat sensitivity of clay, perhaps allowing steam to escape more easily. The amount of lignin sulfonate also influences heat sensitivity, possibly because more lignin sulfonate produces a thicker coating that may limit escaping steam, as with the clay. About 0.5 wt % lignin sulfonate was found to provide the benefits described herein while further decreasing heat sensitivity observed at 1.0 wt %. Even so, 1.0 wt % produced a more robust coating.

The drying occurs from the outside of the balls where heat is passed to the water at the surface of the balls by convective heat transfer from the heated gases. As water evaporates as steam, it is replaced with water from deeper within the ball. The new water passing to the surface of the ball is believed to bring with it additional lignin sulfonate. This process continues until all of the water has been dried from the balls.

The result is that on the order of half of all of the lignin sulfonate ends up on the surface of the balls, forming a layer about 50 microns thick. If less wicks to the surface, then the coating may be thinner, but more remains inside the ball. Apparently due to the wicking mechanism, the remainder of the lignin sulfonate may exhibit a continuously decreasing concentration gradient of lignin sulfonate from the surface into the ball. As a result of the concentration gradient, observation of balls produced according to embodiments herein does not reveal a clear line of demarcation between the coating and the ball surface. Instead, a smooth transition exists into the ball.

Another feature of the lignin sulfonate coating upon drying is that it is tough and adherent, undoubtedly responsible for the surprising attractive process benefits described herein. It is further surprising that the surface coating of lignin sulfonate does not stick the balls together during the drying process, even though the balls are in contact and do not move relative to one another during the drying process. It is possible that the evaporating water from the balls creates a vapor barrier between balls that keeps them from sticking to one another as the coating forms.

One beneficial result is that the strength of the green (as formed) and, especially, the dried ball, is surprisingly high. Their strengths obtained usually exceed that of balls including instead an equal amount of phosphate clay. For example, the dry crush strength may be greater than 25 pounds (lbs). The drop strengths, which measure the number of drops from 18 inches a green or dried ball can sustain before breaking, is also enhanced. This means that fewer balls break at transfer points during conveyor transfers, etc. in a commercial IHP. The strength might be attributed to having a coating covering the ball, a gradient of lignin sulfonate from the surface into the ball, or both.

The balls enter the kiln generally at about 120° C. in the IHP. Observation indicates that less carbon is burned out of the balls when lignin sulfonate is used in the formulation. Apparently, as the balls heat up in the back end of the kiln, the lignin sulfonate pyrolyzes, releasing hydrocarbon gases that pass to the kiln freeboard. These gases form a gaseous layer that restricts the passage of $P_4O_{10}$ from the kiln freeboard to the balls, where it may react with fluorapatite mineral in the ball to form calcium pyrophosphate.

Without the lignin sulfonate coating, as the balls further heat up, the excess phosphorus from the kiln freeboard may react with carbon in the ball at a temperature lower than the main phosphate reduction reaction, removing carbon from the outer shell of the ball. When the carbon has been removed in an area of the balls, then no reduction of phosphorus occurs and the process yield goes down.

At about 650° C., the volatiles from the green petroleum coke component of the ball begin to evolve and further blanket the balls as explained in the Improved Hard Process section below. The carbon in the balls does not oxidize with water or $CO_2$ arriving from the freeboard at a significant rate much below 650 to 700° C. Thus, until the pyrophosphate mechanism was understood during development of the IHP, it was not appreciated that lower temperature protection was of significance. The low temperature volatiles benefit from a larger kiln size as the bed surface-to-volume ratio decreases. The flux of $P_4O_{10}$ coming from the freeboard is related to bed surface area. The flux of low temperature volatiles from the lignin sulfonate increases as the volume of the bed increases. Thus, as the kiln size is increased the blanketing of the bed is proportionately increased.

Note also that the hydrocarbon volatiles from the lignin sulfonate not only blanket the bed, but also react with the $P_4O_{10}$, chemically reducing it as a first reaction step to phosphorus, carbon monoxide, and hydrogen, none of which can oxidize carbon. The amount of hydrocarbon volatiles available for destroying incoming $P_4O_{10}$ is also directly proportional to the size of the kiln. Thus, the lignin sulfonate can be significant in protecting the balls entering the kiln from reaction with $P_4O_{10}$ in the back end of the kiln. The fixed carbon layer from the lignin sulfonate also further protects the fluorapatite from carbon burnout by forming a sacrificial layer that becomes proportionally greater as the surface-to-volume ratio of the kiln decreases due to kiln size scale up.

Another beneficial effect of the lignin sulfonate layer is due to its tough, adherent nature on the outside of the ball. It is during the rapid heat-up region in the back of the kiln where much of the dusting occurs. The dust passes to the freeboard of the kiln where it reacts with $P_4O_{10}$ to form a sticky calcium pyrophosphate material. It either passes with the freeboard gasses into the hydrator, or passes to the wall of the kiln where it can adhere to the kiln wall, eventually building up enough to cause kiln ringing. The tough, adherent nature of the lignin sulfonate layer on the outside of the ball considerably reduces the amount of dusting that occurs. Note that lower dusting also increases the quality of acid that can be made in the IHP by reducing the amount of dust components passing to the acid forming in the hydrator.

Another benefit of using lignin sulfonate is the observed small, but distinct increased yield at low reaction temperature in the IHP in the lab pilot unit where carbon burnout is not operating. The observation may partially result from having the lignin sulfonate carbon more intimately in contact with the phosphate particles in the ball than are the green petroleum coke particles.

Another benefit of using lignin sulfonate is its ease of use. If the small amount of lignin sulfonate (usually about 1.0% of the feed weight) is combined with enough water to form the moist mixture for balling (usually about 9% moisture) it forms a very liquid, low viscosity fluid that can be added to the mixer with a pump and liquid sprays.

A further benefit is that it consumes waste from the sulfite paper production process that might not otherwise be profitably used.

Thus, in an embodiment, a phosphorous pentoxide producing method includes co-grinding a mixture containing phosphate ore, carbonaceous material, and silica. A lignin sulfonate is homogeneously blended with the co-ground mixture. Green feed agglomerates are formed from the blended lignin sulfonate and co-ground mixture, then dried, wicking some of the lignin sulfonate onto a surface of individual drying agglomerates. The wicking forms a lignin sulfonate coating thereon. The dried agglomerates contain phosphate ore particles, carbonaceous material particles containing about 8 to 12 wt % volatiles, and sufficient silica particles for the dried agglomerates to exhibit a calcium plus magnesium-to-silica mole ratio of less than 0.5. At least 80% of all particles exhibit a size less than 200 mesh.

The method includes forming a reducing kiln bed using the dried agglomerates below an oxidizing freeboard of a counter-current rotary kiln, the bed having a length. The bed is blanketed with volatiles evolving at least partly from the lignin sulfonate during bed heat up from about 120 to about 650° C. A sacrificial layer of fixed carbon is retained from the lignin sulfonate coating. The method includes volatilizing at least a portion of the sacrificial layer during bed heat up from about 650 to about 1180° C., maintaining a bed temperature at or above 1180° C. along a portion of the bed length, generating kiln off gas, and collecting phosphorous pentoxide from the kiln off gas. The kiln discharges a residue containing processed agglomerates, less than 10% of the agglomerates' phosphate input to the kiln remaining in the residue.

By way of example, the homogeneous blend may further include water and the drying may involve controlling a drying rate of the green agglomerates. As the water evaporates from the agglomerates, the lignin sulfonate coating forms on individual dried agglomerates by wicking some of the lignin sulfonate onto the surface of individual drying agglomerates without adhering the agglomerates together. The green feed agglomerates may be green feed balls exhibiting a greater than ¼ to less than ½ inch diameter prior to drying. The dried feed balls may exhibit a dry crush strength greater than 25 pounds. The lignin sulfonate coating may have a thickness of about 10 to 40 micrometers and a remainder of the lignin sulfonate may exhibit a continuously decreasing concentration gradient of lignin sulfonate from the surface into individual agglomerates. Individual agglomerates may contain a total of about 0.4 to 2 wt % lignin sulfonate, including the coating.

In addition to the methods described herein, the embodiments may also include feed balls of previously unknown composition. Accordingly, in an embodiment, a phosphate ore feed ball includes a dry, homogeneous mixture of phosphate ore particles, carbonaceous material particles containing about 8 to 12 wt % volatiles, and sufficient silica particles for the ball to exhibit a calcium-to-silica mole ratio of less than 1.0, at least 80% of all particles exhibiting a size less than 200 mesh. The ball further includes a lignin sulfonate both inside the ball and coating a surface of the ball. The coating has a thickness of about 1 to 50 micrometers and a remainder of the lignin sulfonate exhibits a continuously decreasing concentration gradient of lignin sulfonate from the surface into the ball. The ball contains a total of about 0.1 to 4 wt % lignin sulfonate, including the coating. The ball exhibits a dry crush strength greater than 25 pounds.

By way of example, the carbonaceous material may include green petroleum coke. The calcium plus magnesium-to-silica mole ratio may be less than 0.5.

Given that some of the beneficial properties of the feed balls may be difficult to quantify, the feed balls may be characterized by a process for producing them, yielding the beneficial properties described elsewhere herein. Accordingly, an embodiment provides phosphate ore feed balls produced by the process including co-grinding a mixture containing phosphate ore, carbonaceous material, and silica and homogeneously blending water and a liquid containing lignin sulfonate with the co-ground mixture. Green feed balls are formed from the blended water, lignin sulfonate, and co-ground mixture, the green balls containing about 0.1 to 4 wt % lignin sulfonate.

The process includes drying the green balls by passing heated air through a multilayer bed of green balls and controlling a drying rate of the balls. As water evaporates from the balls, a lignin sulfonate coating forms on individual dried balls by wicking some of the lignin sulfonate onto a surface of individual drying balls without adhering the balls together. A remainder of the lignin sulfonate in individual dried balls forms a continuously decreasing concentration gradient of lignin sulfonate from the surface into individual dried balls. The dried balls contain phosphate ore particles, carbonaceous material particles containing about 8 to 12 wt % volatiles, and sufficient silica particles for the dried balls to exhibit a calcium-to-silica mole ratio of less than 1.0. At least 80% of all particles exhibit a size less than 200 mesh.

By way of example, the green feed balls may exhibit a greater than ¼ to less than ½ inch diameter prior to drying. The dried feed balls may exhibit a dry crush strength greater than 25 pounds. The carbonaceous material may include green petroleum coke. The calcium plus magnesium-to-silica mole ratio may be less than 0.5.

EXAMPLE

A dry mixture of 53.4 wt % phosphate pebble, 32.4 wt % silica tailings from a Florida phosphate float plant, 5.2 wt % clay, and 7.2 wt % green petroleum coke was prepared and mixed. The mixture was dry ground to 80%-200 mesh in a open circuit ball mill. The mixture was combined with 9 wt % water in a mixer for 20 minutes to form blend A. A second mixture instead using 8 wt % water and 2 wt % calcium lignin sulfonate liquor (containing 50 wt % calcium lignin sulfonate) was prepared in the mixer as blend B. Both mixtures were formed into balls on a one meter balling pan using a small admixture of water using water sprays and yielding ending moisture of about 11 wt %.

Both sets of green balls had a drop test value of >20, which means that they survived 20 drops from a height of 18 inches without breaking. Both sets of balls were dried at a temperature of about 250° C. in a drying oven overnight. The blend B balls appeared to have a black, leathery, tough coating that was difficult to scrape through with a thumbnail compared to blend A balls, which lacked a coating and could be easily scratched with a thumbnail. The dried blend A balls had a dry crush strength of 18.6 lbs, while those with the lignin sulfonate added gave a 42 lb dry crush strength. Levels over about 14 lbs indicate that the balls can be successfully processed in the kiln with acceptable breakage. However, higher strengths indicate higher resistance to degradation in the kiln.

Due to the high turbulence in the batch kiln, tests were run with equal weights of bedding coke to reduce carbon burnout to a lower level. For these tests, 40 lbs of bedding coke (calcined petroleum coke) was added to a batch kiln measuring 24 inches inside the refractory by 44 inches long and preheated to 1350° C. A 40 lb charge of tests balls was then added and periodic grab samples allowed chemical analysis of the balls to determine how much phosphorus had been released from the balls.

For the blend A balls the ultimate yield of phosphorus was 48% with an indicated carbon burnout rate of 2.8 pounds per hour per square foot. The amount of dusting from the balls was measured by determining how much calcium accumulated in a stainless steel spray tower with venturi scrubber train with water recycled from a small water tank. The calcium measurement indicated a dust load of about 0.85% of the charge of balls over a 95 minute test period. The high dust rate is believed due to the small size of the batch kiln and the high turbulence therein. The blend B balls processed under identical conditions gave a phosphorus yield of 72%, a carbon burnout rate of 1.65 pounds per hour per square foot, and a dusting rate of 0.53%. All of these values are higher than would usually occur in a continuous countercurrent pilot plant test of the Hard process carried out in a 2 ft 9 in ID by 30 ft long kiln. In the continuous kiln the turbulence is much less and the carbon burnout reduced by an order of magnitude.

Improved Hard Process

Through research and development of the KPA process, observation, study, and insight resulted in several process improvements that overcome deficiencies of the processes described in Hard and other references mentioned in the Background section above. Various embodiments of the IHP provide for high yields of phosphoric acid, efficient use of carbonaceous raw material requirements, high kiln throughputs, long refractory life, limited sinoite ($Si_2N_2O$) formation, oxidizing off gas, and the capability of limiting sodium, potassium, fluorine, and sulfur loss from the kiln solids.

Efforts have confirmed that the yield limitations present in the Hard continuous pilot plant resulted primarily from burn out of carbon in a shell that formed on the outside portion of the agglomerate as it heated up to greater than 1180° C., at which temperature the phosphate ore reduction began. The carbon burned out (oxidized) from the outside surface of the ball by reaction with oxidizing gases from the kiln freeboard (e.g., $CO_2$, $P_4O_{10}$, and $H_2O$). Assuming an agglomerate was in the form of a 1.0 centimeter ball and 30 weight % (wt %) of the carbon was burned out, then a white shell about 800 micrometers thick formed on the outside of the ball. The phosphate ore in the shell was not chemically reduced, even after reaching reaction temperature as there was no carbon therein to chemically reduce it, and yield was limited.

Also, sodium, potassium, sulfur and fluorine were largely volatilized from the shell, but were retained in the core containing residual carbon. Thus, limiting carbon burnout may reduce loss of sodium, potassium, sulfur and fluorine from the bed.

The Megy IHP patents teach that after phosphate reduction begins and the phosphorus metal vapor begins to form in the core of an agglomerate, phosphorous metal may encounter oxidizing gases either in the oxidized shell of the ball or in the bed between the balls. The $P_4$ emerging from the core may oxidize into $P_4O_{10}$, which may back react with the unreacted phosphate ore in the shell to form calcium pyrophosphate. Calcium pyrophosphate has a melting point of 973° C. (which is below the reduction temperature) above which it forms calcium metaphosphate. Calcium metaphosphate is in equilibrium with the vapor pressure of $P_4O_{10}$ and maintains a composition near to that of calcium pyrophosphate provided the $P_4O_{10}$ vapor pressure is greater than 1 millimeter of mercury. Such formation of calcium metaphosphate by back reaction of $P_4O_{10}$ with fluorapatite likely further limited yield in the Hard process beyond yield loss directly associated with carbon burnout.

However, efforts taken to limit carbon burnout may also decrease the transfer of $P_4O_{10}$ to the bed and, therefore, decrease $P_4O_{10}$ reaction with ore and formation of calcium metaphosphate. Thus, it becomes doubly significant to reduce carbon burnout from the bed in order to limit the indicated back reaction, further increasing yield and also retaining more sodium, potassium, sulfur and fluorine otherwise lost from the bed.

If the phosphorus metal vapor and associated carbon monoxide from the reduction reaction evolve fast enough, then they sweep the oxidizing gases away from the bed and limit further oxidation of the carbon from the bed. The vigor of the evolution is directly related to the bed surface-to-volume ratio. In sufficiently large kilns, the carbon burnout is effectively stopped during the period when the phosphorus reduction reaction is occurring. Once the reduction reaction occurs, the solid reaction product includes an amorphous (glassy) calcium metasilicate ($CaSiO_3$), which encapsulates any remaining carbon, protecting it from further oxidation.

Since loss of carbon from the ball by carbon burnout may lead to a reduction in yield, limiting the carbon burnout to low levels may provide high yields. Control of carbon burnout may be achieved primarily by implementing one or more of the following measures, which are additive in their effect in reducing carbon burnout:

1) Reducing surface-to-volume ratio of the kiln bed.

2) Using a control system which includes air ports down the length of the kiln to introduce over bed air at a controlled rate to provide for a rapid heating of the kiln feed to the temperature where the phosphate reduction reaction proceeds (i.e. greater than 1180° C.) and maintaining the reduction temperature over most of the length of the kiln.

3) Using appropriate kiln design to reduce turbulence in the region of the kiln where the kiln solids heat up from 700 to 1180° C., where the phosphate reduction reaction begins.

4) Using uncalcined carbonaceous raw material to provide an off gas of hydrocarbons during the heating of the kiln feed to reaction temperature to blanket the bed in reducing gasses and to react with oxidizing gasses.

5) Using finely ground and intimately mixed carbonaceous material in the feed agglomerates to lower the temperature of full phosphate reduction at commercial feed rates to about 1180° C.

6) Adding a small, but sufficient, amount of uncalcined carbonaceous raw material together with the kiln feed agglomerates as bedding to preferentially react with incoming oxidizing gases, particularly phosphorus oxide, from the freeboard.

According to the IHP, a phosphorous pentoxide producing method includes forming a kiln bed using feed agglomerates in a counter-current rotary kiln, the bed having a length and the agglomerates containing phosphate ore particles, carbonaceous material particles, and sufficient silica particles for the agglomerates to exhibit a calcium-to-silica mole ratio of less than 1.0. The method includes maintaining a bed temperature at or above 1180° C. along at least 50% of the bed length without exceeding 1380° C. along the entire bed length. Kiln off gas is generated and phosphorous pentoxide is collected from the kiln off gas, the kiln discharging a residue containing processed agglomerates and less than 10% of the agglomerates' phosphate input to the kiln remaining in the residue as phosphate.

The Megy IHP patents teach that reducing bed surface-to-volume ratio perhaps provides the most significant benefit, particularly in combination with the use of uncalcined petroleum coke or coal as the carbonaceous raw material source in the agglomerates. To process a given bed volume, a stoichiometric amount of oxygen is provided to generate sufficient heat in the off gas to run the process. Supplying the oxygen from air moves a specific volume of kiln freeboard gases countercurrent to the kiln solids.

In scaling up, commercially-sized kilns normally exceed a minimum diameter above which kiln shell heat losses become minor. The cross-sectional area of the bed and freeboard both scale up with the square of the diameter of the kiln. Since the length to diameter ratio of the kiln may be similar regardless of the size of the kiln, the bed volume scales up as the cube of the kiln diameter. The stoichiometric amount of oxygen and the corresponding specific volume of freeboard gases from the air that provides the oxygen are roughly proportional to the bed volume. The cross-sectional area of the freeboard is directly proportional to kiln diameter squared, so the velocity of the gas flowing countercurrent to the kiln solids increases with increasing kiln diameter at a given temperature of operation.

The gas velocity relative to the kiln solids increases with the kiln diameter and the turbulence increases somewhat, but more slowly than in direct proportion to kiln diameter. However, the transfer of oxidizing gases from the freeboard into the bed is reduced, both due to the slower increase in mass transfer associated with the increase in kiln gas velocity and due to the multiple and independent protections of the blanketing and oxidizing gas interceptions taught herein. These mechanisms multiply the effect of kiln scale up and rapidly diminish the carbon burnout rate. The kiln may include dams to better control the depth of the solids over the kiln length. The dams may have a long, tapered approach to limit the turbulence that may otherwise result from their use.

The surface area available for heat transfer from the freeboard gasses to the kiln solids in the bed is directly proportional to the length of the kiln. If stoichiometric air is used to oxidize the phosphorus, carbon monoxide and hydrocarbons from the bed, then the total flow of gas in the kiln increases for an increased bed volume. Thus, the gas velocity in the kiln is directly proportional to the kiln length except that the kiln shell losses decrease with kiln length.

Long kilns are used in heat transfer processes to maximize heat utilization in processes like wet process cement production etc. In a KPA process, a stoichiometric amount of carbon is used to chemically reduce the phosphorus from the bed. The reduction produces a specific amount of combustibles from the bed which, when oxidized with air, give a modest excess of heat in the kiln. The excess heat gives a kiln off gas temperature higher than would be required. A direct result is that a kiln suitable for the KPA process may be shorter rather than longer. The shorter kiln presents a condition that also benefits carbon burnout as the freeboard gas velocity is reduced. Thus, in the KPA process, the carbon burnout rate increases in longer kilns as the freeboard gas velocity increases.

Evaluation of three data sources provided the carbon burnout in batch and commercial kilns. As the first source, sufficient data is available in Folmo et al., *Ilmenite Direct Reduction Project in Norway using the GRATE-CAR™ Process*, AIME Conference, 1992, supplemented by information from Allis Chalmers engineers that started up the facility. The data pertains to carbon burnout rate in a 19 feet diameter by 232 feet long chemically reducing kiln processing ilmenite ore in Tyssendal, Norway since 1986 to produce metallic iron and a higher value $TiO_2$ residue. The kiln solids were held at about 1170° C. and the carbon burnout was about 1.1 pound per hour per square foot. Although not enough data is given in the Folmo article to estimate the freeboard velocity, the kiln was a bit elongated, which probably resulted in a freeboard gas flow rate of perhaps 25 feet per second, as is common in kilns of its shape.

As the second source, in the Leder article discussed in the Background section above, the temperature of the kiln bed averaged about 1200° C. over the length where the carbon burnout was determined to average in the range of 0.2 to 0.3 pounds per hour per square foot. The gas velocity in this much shorter kiln averaged about 3.3 feet per second.

As the third source, a 13.5 inch batch kiln used in IHP Example 3 described below was determined carefully to produce carbon burnout of about 2 pounds per hour per square foot during the time the solids were heating to reaction temperature.

The first observation that can be made from the above data involves the burn out of carbon as a first approximation being directly related to the surface area of the kiln bed, which in turn is directly related to the diameter of the kiln and the length of the kiln. In the two continuous kiln systems above, the amount of surface in the kiln systems changes by a factor of 55, but the carbon burnout only by a factor of 3-4. Most of the higher burnout rate in the larger kiln is due to the increased flow rate of the freeboard gasses. Also, in the Tyssendal kiln with bedding coke, the burnout tends to occur over the entire length of the kiln whereas, in the IHP Example 3 batch kiln, the carbon burns out mostly during the charge heat up period.

The carbon burnout rate in the batch kiln is a factor of 7-10 higher than the continuous kiln even though the "apparent" freeboard gas velocity is only 4.4 feet per second. The batch kiln is closed with a perpendicular lid with a 9 inch hole in it. In fact all of the kiln gases exit through the relatively small hole at an exit velocity of about 30 feet per second. The gas flow through the relatively small hole entrains other gas in the kiln that diverges toward the bed as it hits the lid, setting up a strong recycle gas flow. When this gas flow hits the bed at the lower portion of the lid, it impinges directly on the surface of the bed and the momentum drives the oxidizing gases directly into the bed, resulting in enhanced carbon burnout. The high turbulence in the batch kiln causes high carbon burnout and limits high yield in reduction processes in the batch kiln. The batch kiln represents the standard tool commonly used in the development of kiln processes. The enhanced burnout associated with the turbulence in the batch kiln apparently led researchers to underestimate the prospects for chemically reducing bed processes.

In a continuous kiln operated as previously known, the feed agglomerates enter at about 125° C., and are well away from the inlet end of the kiln by the time they reach the temperature of 700° C. where the carbon burns out of the bed fast enough to be of concern to the process. At that point, the gases in the kiln flow smoothly over the kiln solids with minimum turbulence. In embodiments of the IHP, increased turbulence might be reduced by tapering a dam at the ends of the kiln rather than using an abrupt dam to retain solids in the bed.

The amount of carbon present in the kiln bed relates to the volume of the bed, which relates to the square of the diameter of the kiln per unit length. The carbon burnout is proportional to the surface area, which relates to the first power of the diameter of the kiln per unit length. Therefore, the fraction of carbon that burns out of the kiln bed directly relates to the inverse of the diameter of the kiln. As shown in IHP Example 3 below, the magnitude of the rate of carbon burnout is such that in a small batch kiln (e.g., 13.5 inch diameter batch kiln) it is difficult to have any carbon left in the kiln solids after heating them to reaction temperature. In large, continuous kilns a much greater fraction of the carbon remains in the kiln solids.

Another factor that directly affects the amount of carbon burnout is how long the kiln solids are exposed to oxidizing freeboard gases as they heat up to reaction temperature. In the KPA process, rapidly heating the feed agglomerates to reaction temperature involves a means of oxidizing part of the phosphorus and carbon monoxide off gases from the phosphate reduction reaction down the length of the kiln using the kiln control system described below for FIG. 1 and/or IHP Example 5.

In a 6 foot diameter continuous pilot plant kiln (72 feet long) designed for low turbulence, a kiln system with the ratio of bed surface-to-volume multiplied by the bed heat up time of less than 50 minutes-$ft^2/ft^3$ may obtain yields greater than 92% with high throughput, low impurity volatilization, extended refractory life, and elimination of the competing sinoite reaction described below. As explained below in further detail, larger diameter kilns of greater than 12 feet operating under otherwise identical conditions may provide greater yields, for example, greater than 95%.

In combination with the use of uncalcined carbonaceous material in the feed agglomerates, surface/volume ratio in the kiln bed provides even more benefit. Uncalcined carbonaceous material decomposes when heating to form gaseous hydrocarbons (mostly methane) and a stable carbon residue known in the industry as "fixed carbon," which does not volatilize at process temperatures and is the reactant used to chemically reduce the phosphate ore. The volatiles in carbonaceous components of phosphate ore and coal begin to evolve as soon as the feed agglomerates are heated above room temperature. Green petroleum coke, having already been subjected to coking temperatures, may begin evolving hydrocarbons at about 600° C. Most of the carbonaceous materials finish evolving their hydrocarbons by about 950° C.

During bed heat up, oxidation of fixed carbon by air at a significant rate often does not occur until reaching temperatures above about 700° C., well after the volatiles from green petroleum coke in kiln solids begin to exert their protective effect at about 600° C. Even so, transfer of $P_4O_{10}$ to the bed may occur from the time the solids enter the kiln until they reach reaction temperature. Thus, the time it takes to bring the kiln solids from kiln inlet to 1180° C. defines "heat up time" in the context of the present document, unless otherwise indicated. However, it is clear that the availability of uncalcined carbonaceous material in the kiln solids makes the process somewhat more tolerant to a slower kiln solids heat up rate.

During the vulnerable period when feed agglomerates are being heated to reaction temperature, observation indicates that volatilization of gaseous hydrocarbons provides a gas sweep, significantly limiting the transport of oxidizing species from the kiln freeboard to the kiln bed. The extent of the hydrocarbon gas sweep is directly proportional to the diameter of the kiln. That is, the amount of volatiles present in the bed is directly proportional to the volume of the bed (i.e. the square of the diameter of the kiln per unit of length) while the area that the volatiles come out of the bed is proportional to the area of the bed (i.e. the diameter of the kiln per unit of length). Thus, the flux of hydrocarbons from the surface of the bed is directly proportional to the diameter of the kiln.

However, the amount of volatiles in green petroleum coke is on the order of ten times less than the amount of phosphorus metal and carbon monoxide formed after a given volume of agglomerates reaches 1180° C. Therefore, the effectiveness in sweeping away oxidizing gasses from the freeboard increases with the scale up of the kiln to larger diameters, making commercial-scale operations more important to realize this protection.

It is also important not to allow the volatiles in the petroleum coke to get too high since they provide heat to a kiln system with an oxidizing off gas and, if too high, then they make operating an oxidizing kiln more difficult. In addition, the volatiles add hydrogen to the kiln, ultimately producing water that limits the strength of phosphoric acid that can be made from the process. However, green petroleum coke with less than 12 wt % volatiles may be suitable for use in the KPA process. Reduction in carbon burnout with increasing kiln diameter due to the sweep effect of the volatile gases multiplies the reduction in carbon burnout with increasing kiln diameter due to the surface area limitation of oxidizing gas transport to the bed, thus giving compounded lowering of carbon burnout with kiln scale up.

The evolving hydrocarbons from the kiln bed may have another direct effect on the reduction of carbon burnout from the kiln bed. The volatile hydrocarbons may react with the oxidizing gases from the freeboard in a way that creates a product which is not reducible by the carbon in the kiln bed. Consider the following reaction:

$$CH_4(\text{from bed})+CO_2(\text{from freeboard}) \rightarrow CO+2H_2$$

Neither of the reaction products is reducible by the carbon in the bed. As a result, the hydrocarbon not only sweeps the oxidizing gasses away from the bed, but also intercepts the remaining oxidizing gases and transforms them into nonoxidizing gases. Note that this effect is also directly related to the surface/volume ratio in the kiln bed and multiplies the reduction in carbon burnout fraction by the two mechanisms discussed above.

Even though the use of uncalcined carbonaceous material evolves volatiles effective in substantially reducing carbon burnout in large enough kilns, its evolution from the bed is largely complete at 950° C., leaving the bed largely unprotected between 950 and 1180° C., where the phosphate ore reduction reaction proceeds at a reasonable rate. In order to minimize the carbon burnout during that interval, incoming kiln solids may be heated to reaction temperature as rapidly as possible.

Special provisions may be made to rapidly heat up the kiln solids. The KPA process is unusual in that essentially all of the fuel required to heat the kiln and feed agglomerates and to provide the heat for the endothermic phosphate reduction reaction is generated as a result of the reduction reaction itself. The reaction forms phosphorus metal and carbon monoxide off gases according to the reaction:

$$Ca_{10}(PO_4)_6F_2+9SiO_2+15C \rightarrow 3/2\ P_4(\text{gas})+15CO(\text{gas})+9CaSiO_3+CaF_2$$

The combustion of the carbon monoxide and phosphorus metal from the reduction reaction, the burning of coke volatiles, and the oxidation of some of the carbon from the bed generates all the heat necessary for the KPA process. Nevertheless, the heat must be distributed down the kiln to be effectively used. The hot combustion gases that result from the burning of phosphorus and carbon monoxide do not have sufficient latent heat to supply the endothermic needs of the phosphate reduction reaction. Therefore, previous attempts by Hard, Megy, etc. to run the KPA process by passing air entirely into the burner end of the kiln resulted in runaway temperatures over a small length of the kiln near the burner.

Such a runaway reaction occurred in the continuous kiln pilot plant of the Leder article discussed in the Background section above and not only limited its performance, but forced it to be operated at high silica feed formulations, chemically reducing off gas, and a high temperature peak near the burner end. Together with modest yields, the processing restrictions resulted in lowered commercial prospects for the process. One means to spread the heat generated by the burning of the phosphorus metal gas and carbon monoxide down the kiln is to limit the amount of oxygen present at the site of the reaction near the burner. Limiting oxygen leaves phosphorus and carbon monoxide in the freeboard which is then burned with cold air from over bed air ports as needed to supply an even temperature down the kiln.

Ported kilns are not common, but have been used previously in several commercial kiln processes to supply over bed air for down kiln combustion or place air or other gases under the bed as a reactant. Using a ported kiln to supply controlled over bed air to the KPA process allows the temperature to be held at an optimum temperature profile for forwarding the phosphate reduction reaction over most of the kiln length and to bring the incoming kiln solids rapidly up to reaction temperature. By reducing the time the kiln feed agglomerates spend in reaching reaction temperature the carbon burnout may be reduced. As discussed below in relation to FIG. 1, a control system may be implemented to achieve the desired effects of over bed air addition.

Several other benefits accrue to the establishment of a long reaction zone at a just sufficient minimum kiln bed temperature, including: much increased processing rates due to the longer reaction times for heat transfer, longer refractory life, reducing clinker formation and refractory-kiln solids interactions, eliminating sinoite formation, and minimizing the loss of sulfur, sodium, potassium, and fluorine from the bed.

The Megy IHP patents teach that the sinoite reaction occurs during the operation of the KPA process if run at higher temperatures. The reaction of nitrogen from the freeboard and silica with fixed carbon in the reducing kiln bed competes with the phosphate reduction reaction above 1310° C. Between 1180° C. and 1310° C. the phosphorus reaction occurs, but not the sinoite reaction. If the KPA kiln residue is heated to over 1310° C. after the phosphate ore has been chemically reduced, then the sinoite reaction proceeds, using up any excess carbon. When the carbon is exhausted from the kiln solids residual, it becomes stickier and more difficult to handle. The sinoite does not otherwise help the KPA process, so it is useful to get maximum throughput and discharge the kiln solids from the kiln as soon as the phosphate ore has been chemically reduced.

One additional method of limiting carbon burnout in the KPA kiln includes adding a small amount of loose, small sized pieces of a carbonaceous material together with the raw material feed agglomerates to the KPA kiln. If the kiln has a small enough bed surface/volume ratio and a fast enough feed heat up rate, then small amounts of carbonaceous material at about 1-2% of the weight of the feed agglomerates are sufficient to provide sacrificial carbon burnout throughout the feed agglomerates while heating them to reaction temperature. Such additions of sacrificial carbon outside the feed agglomerates are more effective than adding more carbon to the raw material mixture that make up the agglomerates.

An advantage exists in using uncalcined carbonaceous material since the volatiles therefrom contribute to the volatiles sweep effect and to the reaction with the incoming oxygen flux from the freeboard, decreasing $P_4O_{10}$ condensation and calcium metaphosphate formation. It is particularly advantageous to use carbonaceous material that evolves some volatiles between 100° C. and 650° C., which limits $P_4O_{10}$ transfer from the kiln freeboard to the cold raw material agglomerates entering the kiln. The $P_4O_{10}$ otherwise condenses on the cold feed balls at less than 485° C. and can react with fluorapatite ($Ca_{10}(PO_4)_6F_2$) to form calcium pyrophosphate. Additionally, $P_4O_{10}$ may react with carbon at about 800° C. Enrichment of feed balls with phosphorous in such manner essentially recycles phosphorous from the back end of the kiln to the front end. Such enrichment accentuates carbon burnout by placing an increased demand on carbon to re-reduce phosphorous in the condensed $P_4O_{10}$ and/or calcium pyrophosphate. Although the slow mass transfer from the kiln freeboard to the bed limits the extent of this occurrence, particularly in larger kilns, it can be further mitigated by the low temperature volatilization of organics from the carbonaceous material.

If the phosphate ore has a suitable organic level it is useful for this purpose. Coal also has low temperature volatile organics that is useful for this purpose. The carbonaceous material may be more effective if sized to small pieces that present maximum surface area to the incoming oxygen flux. The particle size should not be so small that it entrains as dust into the freeboard gases of the kiln. Carbonaceous material in the ¼ inch to ½ inch size range has been found to be effective.

Fine grinding of the carbonaceous material and its effective distribution in the raw material agglomerates may be important to the process. Jacob et al., *Reduction of Tricalcium Phosphate by Carbon*, I&EC, Vol. 21, No. 11, 1929, 1126-1132 and Mu et al., *Thermodynamics and Kinetics of the Mechanism of Reduction of Phosphate Ores by Carbon*, Met. Trans. B, 17B, 1986, 861-868 discuss that phosphate reduction with carbon is a first order reaction, but neither describe the effect of carbon surface area on the rate of reaction or the effect of intimate mixing. Observation indicates the rate controlling step in the KPA process is the diffusion of phosphorus and silica molecules across a growing calcium monosilicate layer around each carbon particle. As the layer thickens, the reaction slows down, giving the known first order reaction rate behavior.

Grinding the carbon finer not only gives a higher surface area for a given weight of carbon, but also decreases the distance between the carbon particles. Thus, the diffusion path to the carbon particles is shortened for the phosphate and silica. The Megy IHP patents teach that the carbon particle diameter shrinks as it reacts, resulting in a void between the carbon and the phosphate ore/silica that may add extra resistance to phosphate reduction when the carbon particle size is greater than 200 mesh. With such larger sized carbon particles, a slower reaction rate exists due to a lower specific surface area. Also, the added distance between particles results in a logarithmic increase in the time it takes at a given temperature to consume all the phosphate between the particles.

Intimate mixing of the carbon ensures realization of the advantageous diffusion characteristics and may be efficiently accomplished by co-grinding the raw materials. Otherwise, carbon particles, even though smaller, may clump together and provide less benefit since a clump of small particles functions like a single large particle. Maintaining a higher reaction temperature can increase the phosphate/silica diffusion rate to overcome a lack of mixing or a larger carbon particle size. However, the higher reaction temperature may reduce kiln throughput, increase volatilization of bed impurities, increase sinoite production and loss of phosphate yield, increase carbon burnout, lead to reduced refractory life, and create other problems. Observation indicates that open-circuit ground green petroleum coke, 80% of which exhibits a size less than 200 mesh, providing an amount of fixed carbon 1.3 times a theoretical carbon requirement for reduction of all phosphate in the ore can carry out over 95% phosphate reduction in less than two hours when intimately mixed in the agglomerates. However, over 95% phosphate reduction takes over six hours if −140/+200 mesh coke is used instead. "Open circuit" grinding refers to batch grinding until a charge of material meets specification as opposed to "closed circuit" where material meeting specification is continuously removed and other material remains for further grinding. Open circuit grinding thus generates more fines.

According to another embodiment of the IHP, a phosphorous pentoxide producing method includes forming a kiln bed using feed agglomerates in a counter-current rotary kiln, the bed having a length and the agglomerates containing phosphate ore particles, carbonaceous material particles, and sufficient silica particles for the agglomerates to exhibit a calcium-to-silica mole ratio of less than 1.0. Individual agglomerates substantially exhibit a same elemental composition, a same calcium-to-silica mole ratio, and a same proportion of excess fixed carbon compared to a theoretical carbon requirement for reduction of all phosphate in the ore.

Co-grinding and other concepts described herein may provide such agglomerates. The method includes maintaining a bed temperature at or above 1180° C. along a portion of the bed length and establishing a bed surface-to-volume ratio multiplied by a time for bed heat up to 1180° C. of less than 50 minutes-ft$^2$/ft$^3$ to obtain a yield of greater than 90%.

By way of example, the bed temperature may be maintained at or above 1260° C. along at least 50% of the bed length. Maintaining the bed temperature may include not exceeding 1380° C. along the entire bed length. The method may further include blanketing the bed with volatiles evolving from the carbonaceous material during bed heat up from about 600 to about 950° C. Also, the kiln bed may include, initially, from about 1 to about 2 wt % bedding coke or coal. Such bedding may blanket the bed with volatiles evolving from the bedding coke or coal during bed heat up from about 100 to about 650° C.

Over bed air and/or oxygen may be added through a plurality of ports along the bed length, the ports being of sufficient location, number, and throughput to decrease a time for bed heat up to 1180° C. compared to otherwise identical processing without the over bed air and/or oxygen. Control systems may provide for monitoring of temperature at an inner surface of the kiln at a plurality of points along the bed length, the inner surface contacting the bed, and also monitoring oxygen and carbon monoxide content of the kiln off gas. Further monitoring of carbon dioxide content may provide a check against the values obtained for oxygen and carbon monoxide content.

The Lapple and Megy patents introduced in the Background section specify a calcium-to-silica mole ratio greater than 1.0. However, observation indicates that a eutectic composition between the calcium metasilicate product from the reduction reaction and unreacted fluorapatite arises part way through the reduction step in such processes and results in melting problems in attempts to carry out such processes in rotary kilns. It is believed that all attempts to carry out the KPA process with calcium-to-silica mole ratios greater than 1.0 cannot be successful unless implementing very high calcium-to-silica ratios, as taught in the Park patent. Consequently, the embodiments of the IHP herein are advantageously limited to a ratio less than 1.0.

FIG. 1 shows a block diagram demonstrating process flow for the KPA process. A range of phosphate ores may be processed by the KPA process by adjusting the raw material composition to accommodate the impurity level therein. For example, if the raw material mixture contains less than about 1.5 wt % Al$_2$O$_3$, then silica admixtures may be processed with calcium-to-silica mole ratios approaching 1.0. On the other hand, if ores up to about 2 wt % Al$_2$O$_3$ are processed, then the calcium-to-silica ratio may be less than 0.5 to reduce melting problems in the kiln and provide enough temperature window for commercial operation. No need exists to remove fines from the ore. Some fines are beneficial in forming strong agglomerates for the KPA process. If washed ore is used for impurity control or to reduce moisture in the feed ore, then bentonite or other clay additions to the raw material mixture help to make sufficiently strong balls.

The amount of silica added also affects the overall heat balance of the kiln. Greater than stoichiometric amounts of fixed carbon are used to fully chemically reduce the phosphate ore in the KPA process. The phosphate ore reduction produces a stoichiometric amount of phosphorus metal vapor and carbon monoxide fuel. Thus, the KPA process tends to develop more than enough heat to be utilized in the kiln with an oxidizing off gas. Additional silica in the mixture uses up some of the heat albeit at the expense of additional grinding and handling costs.

Phosphate ore deposits, as mined, frequently have sufficient silica content to meet the requirements of the KPA process. Sometimes a mixture of the washed and unwashed ore is used to provide sufficient clays for binder, but some clay ore removal may occur to meet the desired aluminum level for a given silica addition level. Potassium and sodium level in the ore can be a problem if at unusually high levels. Iron impurities may reduce yield by combining with phosphorus to form a ferrophosphorus alloy, which stays in the kiln residue. At levels normally found in the US phosphate ore deposits, iron reduces yield to phosphorus oxide in the off gas by 1.5-3%.

In some cases it may be economically advantageous to use phosphate ore with pebble phosphate rock removed for other uses and the remaining silica, phosphate rock mixture beneficiated by fatty acid floatation to adjust silica level. High moisture levels in the as mined phosphate ore mixture that are expensive to dry may affect raw material selection for the process. Clay added to the process usually contains high associated moisture levels, but usually has a particle size distribution largely under 200 mesh. Thus, the clay need not be ground and wet clay can be added to the other dry ground raw materials, also supplying the water required in the agglomeration or balling operation. Such measure reduces the overall drying requirements when wet clay is the binder.

The selection of the phosphate ore to use in the KPA process may be made to minimize its cost. If one mine serves both KPA and dihydrate phosphoric acid production plants, then additional options are available in selecting phosphate ore from one of the partially beneficiated steams as a component of the KPA raw material mixture.

In dry ore deposits, the phosphate ore feed to the KPA process may be as-mined phosphate ore matrix. Part of the matrix may warrant washing if the Al$_2$O$_3$ concentration is too high and silica additions may be desired if the ore does not contain enough silica.

Sufficient carbonaceous material may be added to the phosphate ore to result in fixed carbon content in the raw material mixture of about 1.3 times the theoretical carbon required to chemically reduce the phosphate contained in the raw material mixture. The volatile content of the carbonaceous material may be limited to less than 12 wt % to achieve a favorable heat balance in the KPA process kiln (maintaining an oxidizing off gas) and to limit hydrogen addition to the raw materials. The level of hydrogen input to the kiln limits the maximum concentration of phosphoric acid that can be made in the KPA process. Green petroleum coke may be used as the carbonaceous material with volatiles in the 8-10 wt % range, where they are high enough to offer protection against carbon burnout in larger kilns, but not so high that hydrogen additions interfere with producing 72-76% phosphoric acid from the KPA process.

High sulfur, green petroleum coke may be used in the KPA process since most of the sulfur stays with the kiln residue in an optimally run process. With power production as the main alternative use for petroleum coke, high sulfur petroleum coke is generally cheaper than low sulfur petroleum coke due to the expense of removing sulfur from the stack gas of power plants. While coal may be equally effective for such purposes in the KPA process, only coal with unusually low volatiles has low enough hydrogen levels to curtail heat balance problems and limitation of the concentration of the phosphoric acid product. Alternatively, the coal can be calcined, but then the cost of additional processing becomes a factor.

An example of a suitable raw material feed mixture for a favorable deposit in the US state of Idaho is one part as-mined raw ore matrix which has been processed to remove material larger than 3 inches and 0.09 parts green petroleum coke sized 3 inches and down. To supply a 19-foot diameter (inside the bricks) rotary kiln to make 200,000 short tons per year ($P_2O_5$ basis) in the form of super phosphoric acid (SPA) requires about 230,000 pounds/hour (lbs/hr) of raw matrix ore and 23,000 lbs/hr green petroleum coke.

In process flow of FIG. 1, the raw materials are analyzed for moisture and metered together to form a raw material mixture then dried to 1.5 wt % moisture in a rotary drier using waste heat from the rotary cooler used later in the process. The dried ore mixture is sized to about ⅜ inch in a crushing/screening circuit and passed into an open circuit dry ball mill for grinding to 80%-200 mesh. Next, 9 wt % moisture is added to the co-ground raw material mixture and the result formed into balls in a balling drum/roller screen circuit with the addition of 3 wt % additional water in the balling drum sprays to control the ball growth. The balls exhibit a greater than ¼ to less than ½ inch (+¼/−½) diameter.

Thereafter, the wet green balls are layered on a perforated stainless steel belt and dried in a low temperature belt drier with waste heat from the kiln spent solids cooler later in the process. Further, 1 wt % (i.e., 2,500 lbs/hr) bituminous coal sized to +¼/−½ inch is added to the wet feed balls as they pass into the continuous belt dryer. The agglomerates/bituminous coal feed leaves the drier at 125° C. and passes into a 19 foot diameter (inside the bricks) rotary kiln.

The kiln of FIG. 1 is a ported kiln equipped with a circumferential channel with a moving seal that passes air from blowers outside the kiln through headers with volume control valves and ports to the inside of the kiln wall where the air is distributed along a channel in the brick and then to the freeboard of the kiln through slits in the brick. Shut off valves on each of the headers are turned on and off during each rotation to pass air into the freeboard only when the ports are above the kiln bed. The Folmo article referenced above describes such a kiln.

However, the kiln of FIG. 1 additionally includes a temperature and off gas control system. The kiln is fitted with on board thermocouples every 6 feet which measure the temperature of the brick about ⅜ inch below the hot surface of the brick. The temperature seen by these thermocouples can be related to the brick surface temperature as measured by an optical pyrometer when the kiln is empty. When the KPA process is operating, the white, opaque phosphorus burning flame obscures the view of an optical pyrometer, which is the common way to determine internal kiln temperatures in other processes. Even so, the temperature data obtained from the thermocouples may be relied upon to control air addition through the ports and, thus, temperature profile along the kiln length.

The kiln feed agglomerates are rapidly heated to 1180° C. by the hot counter currently flowing freeboard gasses and maintained above that temperature over most of the kiln length by adjusting the addition of air along its length to achieve the corresponding onboard brick thermocouple readings. The feed end of the kiln includes a tapered dam to reduce the turbulence associated with a dam commonly used in these kilns to retain solids. Reduction in turbulence at the feed end achieves greater benefit than at the burner end since the reaction is completed at the burner end. A small flame is maintained at the burner to stabilize the front of the kiln and achieve overall heat balance.

An off gas analyzer capable of analyzing CO, $CO_2$, and $O_2$ is included and continuously monitored to ensure the kiln maintains a slightly oxidizing off gas. The above air addition control system may maintain the desired kiln temperature profile. However, the off gas analyzer may be used to monitor whether other process changes might be warranted, in keeping with the discussion herein, so that the air added is also sufficient to oxidize all of the $P_4$ and CO, with $O_2$ in slight excess.

The hot kiln solids in FIG. 1 pass out of the kiln past an isolation curtain into a rotary cooler. Heat is recovered from the hot balls into an air stream, which is used to dry the combined raw materials and the green balls from the balling drum. The cooled balls pass out of the cooler, through an isolation valve to a conveyor belt that removes the spent balls to a disposal site.

The hot gases containing the $P_4O_{10}$ product exiting the FIG. 1 kiln at about 1100° C. pass through a dust cyclone and then go to a spray tower that contacts the off gas with recirculated, cooled strong phosphoric acid that absorbs about one half of the $P_4O_{10}$ therein and cools the off gas to about 260° C. The product phosphoric acid (68-76% $P_2O_5$) is split from this recycle stream. The remaining phosphoric acid is removed from the gases leaving the spray tower in a high pressure drop venturi, which has recirculated, cooled weak phosphoric acid as the scrubbing liquid used as required to make up liquid volume in the spray tower liquid. The product scrubber in FIG. 1 includes the spray tower and venturi and may produce any concentration of $P_2O_5$ less than or equal to about 76%. However, 72% may be selected because it is at the bottom of a eutectic and remains more fluid at room temperature, albeit still with a relatively high viscosity.

An induced draft (ID) fan pulls the gasses through the kiln and off gas scrubbing system of FIG. 1. The gasses exiting the ID fan are treated with a flue gas desulfurization scrubber to remove acidic components from the off gas before it discharges to the environment.

IHP Example 1

Raw phosphate ore from the Meade formation near Soda Springs, Id. was combined with raw silica ore from a mine near Soda Springs, Id. and delayed green petroleum coke from a gulf coast petroleum refinery such that the calcium-to-silica mole ratio was 0.56 and the fixed carbon in the petroleum coke was 1.3 times the theoretical to chemically reduce the phosphate in the mixture. The mixture contained 13.43 wt % $P_2O_5$, 21.33 wt % CaO, 42.42 wt % $SiO_2$, and 7.38 wt % fixed carbon on a dry basis. The mixture was dried and then ground to 80.2%-200 mesh in an open circuit ball mill. Twelve percent water was added to the ground mixture and formed in a die into several ½ inch diameter pellets which were then dried in an oven at 280° F. One pellet was placed in a graphite crucible with a graphite lid and the crucible and its contents heated at 20° C./min to 1180° C. and held for one hour under an atmosphere of nitrogen. After cooling the crucible to room temperature the pellet was analyzed to determine how much phosphorus had evolved from the pellet. The experiment was repeated with the time at 1180° C. increased to two hours and then to four hours. It was found that 61%, 82% and 97% of the phosphorus had evolved from the pellet in 1, 2, and 4 hours at 1180° C., respectively.

Over 100 experiments were additionally performed using the same procedure with a range of temperatures, impurity levels, reaction times, calcium-to-silica mole ratios, grind sizes, and carbon addition levels. Some of the most significant variables are summarized in FIG. 2.

IHP Example 2

Several of the spent pellets from IHP Example 1 were analyzed and compared to the analyses of the feed pellets to determine the fate of impurities in the feed compositions. The elements that volatilized either partially or totally from the pellet during the phosphate reduction together with the weight fraction of the element in the feed pellet, were Ag (<1 ppm), As (10.2 ppm), C (8.2%), Cd (33 ppm), Cl (90 ppm), Cs (1.3 ppm), F (1.27%), Ga (3 ppm), Hg (0.22 ppm), K (0.44%), N (0.13%), Na (0.25%), P (6.55%), Pb (7 ppm), Rb (18 ppm), S (0.73%), Se (6.8 ppm), Tl (1 ppm), and Zn (688 ppm). The elements which were present in significant amounts, which were of concern, and which evolved from the feed pellets were K, Na, S, and F. FIG. 3 shows the weight fraction of these elements which volatilized from the pellet over a range of hold temperatures as compared to the weight of the elements in the feed agglomerates. The composition of the pellets tested in this volatilization study is the same as given in the 1180° C. tests given in IHP Example 1.

Thus, in a fully reducing environment, part of these elements volatilized from the kiln solids. To the extent an oxidizing shell forms from carbon burnout, the loss of these elements is expected to be much higher therein.

IHP Example 3

The co-ground ore/silica/green petroleum coke mixture indicated in IHP Example 1 above was blended with 9 wt % moisture and formed into +¼/−½ inch balls on a 3 foot balling pan with an additional 3 wt % moisture added through control sprays on the balling pan. The balls were dried in a tray drier, and a twenty pound charge of balls was processed in a 13.5 inch diameter by 22¼ inch long batch rotary kiln at 1320° C. The kiln was fired with 1 to 2 feet$^3$/minute (cfm) of propane, about 44 cfm of air, and 0 to 2 cfm of oxygen as necessary to hold the temperature at the set point. The kiln was fitted with an onboard thermocouple and had zircon refractories.

The kiln was preheated to 1189° C. and twenty pounds of balls were charged to the batch kiln with a scoop. Samples of the kiln solids were sampled every fifteen minutes and analyzed to determine the burnout of carbon and the extent of phosphate reduction. The surface of the kiln bed reached 1271° C. by the minute sample, overshot to 1332° C. by the 30 minute sample, and was 1320° C. for the 45 minute sample. The carbon content of the entering ball was 8.75%, but the sum of volatiles and carbon that reacted with iron oxide and carbonate during heat up was estimated at 0.96% leaving 1.56 pounds of fixed carbon in the 20 pound charge to the furnace. The amount of phosphorus that had evolved, the carbon which had burned out, and the carbon remaining in the balls is given for the three samples in Table 2.

TABLE 2

Carbon burnout and phosphorus evolved from 13.5 inch batch kiln test.

| Sample | P evolved | C Reacted | C Burnout | C Remaining |
|---|---|---|---|---|
| 15 minute | 10% | 8% | 49% | 43% |
| 30 minute | 27% | 21% | 62% | 17% |
| 45 minute | 29% | 23% | 75% | 2% |

From this data 62% of the fixed carbon that was in the ball was burned out by oxidizing gasses in 16 minutes as the bed solids heated from 700° C. to 1180° C. where the phosphate reduction reaction commenced. The surface area of the bed was 1.69 square feet and the volume of the bed was 0.28 cubic feet. Therefore the carbon burnout rate was 3.46 pounds per hour per square foot, and the heat up time times the surface-to-volume ratio equals 97 min-ft$^2$/ft$^3$.

The twenty pounds of feed agglomerates charged to the kiln contained green petroleum coke with 0.19 pounds of volatiles. Since these volatiles emerged from the bed over about a fifteen minute period, their flux was about 0.45 pounds per hour per ft$^2$. The phosphorus and carbon monoxide gases from the run were 29 wt % of the total phosphate ore mass charged to the batch kiln and totaled 0.67 pounds over about twenty minutes or about 1.19 pounds per hour per ft$^2$. The carbon burnout and phosphate reduction were occurring so rapidly with regard to the 15 minute samples in the very small batch kiln that the protective effect of the volatiles from the green coke was not sufficient to be clearly observed. Nevertheless, the existence of a protective effect of the phosphorus metal and carbon monoxide was suggested in the data from this test.

Samples of the product balls after 45 minutes in the kiln were split in two and a white shell and black core with a sharp boundary between them was observed. The thickness of the shell was measured at a number of points around the circumference on several different balls to obtain an average thickness. From these measurements and the diameter of the ball, the volume fraction of the shell with the carbon burned out was determined to be 70%, and quite consistent over several balls. The shell was determined to contain silica, $Ca_3(PO_4)_2$, and an amorphous phase likely to be calcium metaphosphate. The phosphorus in the shell was analyzed at 22.5 wt %, which is considerably enriched over the starting phosphorus level in the feed ball. The core contained less than 1 wt % residual phosphorus. The shell composition indicated the reaction of phosphorus metal in the shell or the area between the balls with oxidizing gases from the freeboard, forming $P_4O_{10}$ which, in turn, reacted with fluorapatite in the shell to form the amorphous phase. Table 3 lists analyses of the feed ball, shell, and core.

TABLE 3

Analysis of the core and shell from the 45 minute sample in batch kiln test of IHP Example 3.

| Component | Feed Ball | Core | Shell |
|---|---|---|---|
| $P_2O_5$ | 13.95% | 0.3%* | 20.7% |
| CaO | 20.16% | 23.25% | 18.42% |
| MgO | 0.279% | 0.324% | 0.240% |
| $SiO_2$ | 24.6% | 42.33% | 35.34% |
| $K_2O$ | 0.326% | 0.390% | 0.149% |
| F | 1.54% | 0.647% | 0.057% |
| S | 0.783% | 0.488% | 0.022% |

*From XRD analysis.

IHP Example 4

A mixture of washed, but not beneficiated phosphate ore matrix direct from a Florida phosphate mine and calcined petroleum coke with an analysis of 11.0% $P_2O_5$, 15.9% CaO, 56.2% $SiO_2$, and 11.4% fixed carbon respectively, was ground to 80% −325 in a dry ball mill and formed into balls using a balling pan. These balls had a calcium-to-silica mole ratio in the feed of 0.304 and fixed carbon at 2.45 times the theoretical amount to chemically reduce the phosphate ore therein. The dried balls were passed into a 33 inch diameter (inside the bricks) by 30 foot long counter-current kiln at 600 pounds per hour, ultimately reaching a bed temperature of 1520° C. near the burner end of the kiln at the furthest point into the kiln that could be observed with an optical pyrometer.

The dense, white flame of burning phosphorus obscured making temperature measurement further into the kiln.

During the continuous kiln operation, the kiln was stopped briefly and samples of kiln solids were taken at the discharge of the kiln and with a long probe at 3¾ foot, 7½ feet, 13¼ feet, and 15 feet from the hot end of the kiln. The samples were analyzed for carbon, calcium, and phosphorus. The percent of phosphorus and carbon volatilized, the mass (lbs/hr) of carbon consumed in the phosphorus reduction (C(P rx)), and the mass (lbs/hr) of carbon burned out (CBO) at each sample location was calculated with the results shown in Table 4.

TABLE 4

Analytical data from continuous KPA pilot plant run.

| Dist from Feed | % P loss | % C loss | lbs C (P rx)/hr* | lbs CBO/hr |
|---|---|---|---|---|
| Feed | 0 | 0 | 0 | 0 |
| 15 feet | 2 | 20.2 | 0.6 | 13.3 |
| 18.75 feet | 10 | 35.7 | 2.8 | 21.6 |
| 22.5 feet | 49 | 52.6 | 13.7 | 22.3 |
| 26.25 feet | 65 | 58.6 | 18.1 | 22.0 |
| 30 feet | 72 | 61.4 | 20.1 | 21.9 |

*This is the amount of carbon in pounds/hr that was consumed by reacting to chemically reduce phosphate ore within the ball.

The kiln was not ported and all of the oxygen required to oxidize the phosphorus and carbon monoxide arising from the bed was burned with air added at the burner end of the kiln. The observed position where phosphorus was volatilized given in Table 4 showed that most of the phosphorus and carbon monoxide were generated and burned over a narrow length of the kiln at the burner end of the kiln. Thus, a narrow temperature spike occurred with the peak temperature of 1520° C. to get the 72% phosphorus yield during the short time duration of the temperature spike. The kiln overall had an off gas that was reducing, meaning that it contained no excess oxygen. Often, reducing off gas thus contains unoxidized CO and may even contain some unoxidized $P_4$.

The kiln solids had a relatively long heat up time where the kiln solids were between 700° C. and 1180° C., during which time carbon was burned out of the shell. The calcined petroleum coke used in the feed formulation did not evolve any volatiles to protect the kiln bed during heat up. However, once significant generation of the phosphorus metal and carbon monoxide evolved from the kiln solids commenced about 19 feet into the 30 foot kiln, the rate of carbon burnout was essentially stopped as shown in the lbs CBO/hr column of Table 4.

The amount of phosphorus and carbon monoxide that evolved per hour in the kiln was 40.8 pounds per hour, which evolved over about a 6 foot length of the kiln in which the solids spent about 30 minutes and which had a bed surface area of 13.37 ft². In this case the resulting flux of 6.1 pounds per hour per square foot substantially limited oxidizing gas transport to the bed and essentially stopped carbon burnout during the period of phosphate reduction. The product calcium metasilicate glassy residue also encapsulated the remaining carbon and helped protect it from carbon burnout.

The spent balls that exited the kiln were broken in half and observed to have a white shell and a black interior with a sharp line of demarcation between the two areas. The white shell had no fixed carbon and high levels of phosphorus remaining. The black core had phosphorus reduction of over 96% and carbon remaining in the core.

The heat up time of the bed from feed temperature to 1180° C. was about 2.23 hours, which gives a bed surface-to-volume ratio times heat up time value of 334 minutes-ft²/ft³. The carbon burnout rate during heat up was 0.272 pounds per hour per square foot.

Hypothetical IHP Example 5

The observations made in the preceding IHP examples allow calculation of the performance of a full-scale commercial KPA kiln run according to the various embodiments of the IHP. Kiln feed balls made from raw matrix ore with calcium-to-silica mole ratio of 0.5 and a fixed carbon content of 1.3 times the theoretical amount to chemically reduce the phosphate in the ore are made by combining 1 part raw matrix phosphate ore with 15% contained $P_2O_5$ from the Mead formation in Idaho, trammeled to remove +3 inch oversize material, and 0.09 parts green petroleum coke sized 3 inch and less. This mixture is dried in a rotary drier, sized to ⅜ inch and less and co-ground in an open circuit ball mill to 80%-200 mesh. The ground ore is formed into +¼/−½ inch balls on a balling drum which are dried in a grate drier. One and a half percent coal sized to +¼/−½ inches is added to the balls prior to the grate drier.

This feed is processed at the rate of 490,000 pounds per hour in a 19 foot diameter (inside the bricks) by 220 foot long rotary kiln equipped with a porting system to supply over bed air as required to provide the desired temperature profile, on board brick thermocouples, and an off gas analyzer capable of analyzing CO, $CO_2$, and $O_2$. The loading in the kiln is 15% and the kiln burden spends one and one/half hour in the kiln. It is heated to 1260° C. in 30 minutes and the temperature held at 1260° C. until the solids discharge from the kiln one hour later. The bed volume is 9,945 ft³ and the bed surface area is 3,600 ft².

The coal which has 25% volatiles which produces about 880 pounds per hour of volatiles while the incoming kiln feed mixture is heated from an entering temperature of 125° C. to 600° C. which occurs in 10 minutes. Thus, the flux of hydrocarbons in the cold end of the kiln is 2.3 pounds per hour per ft², which by comparison with the phosphate reduction flux that provided protective above, is sufficient to give a modest protective effect to prevent $P_4O_{10}$ from the freeboard from condensing on the cold balls.

Heating the balls from 600° C. to 950° C. takes another 10 minutes. During this time the volatiles from the green petroleum coke and the coal total 4,480 pounds providing a protective flux of 45 pounds per hour per square foot. In addition, the light molecular weight of the volatiles and their ability to react with the incoming oxidizing gases make them more effective than phosphorus metal and carbon monoxide fluxes which were found to be effectively protective at a flux one ninth as great in IHP Example 4.

During heating from 950° C. to 1180° C. which takes an additional 10 minutes the balls are subject to carbon burnout at a rate of about 1 pound per hour per square foot over 1660 square feet or about 1660 pounds per hour of carbon burnout. The sacrificial carbon intercepts about 40% of the incoming oxidation so the fixed carbon burned out of the balls is about 1000 pounds per hour or about ¹⁄₄₀th of the fixed carbon in the incoming balls. This results in the carbon being burned out of a thin shell on the outside of the feed balls, which is not chemically reduced after the balls reach reaction temperature. Thus a loss in yield of just over 2% results from carbon burnout in this area.

The bed volume to surface area ratio times the heat up time in this commercial kiln is 11 minutes-ft²/ft³.

After the balls reach 1180° C. until they discharge from the end of the kiln a total of 98% of the phosphate ore is chemically reduced giving rise to 91,800 pounds per hour of phosphorus metal and carbon monoxide flux through 6,630 square feet of bed or a flux of 13.8 pounds per hour per square feet ore several times the flux found in IHP Example 4 to be substantially protective against carbon burnout. During this time the fixed carbon from the coal on the outside of the balls and the carbon rich core inside the ball allow some reduction of phosphorus in the shell, mitigating somewhat the loss of yield from carbon burnout in the shell. Three percent of the phosphorus that forms remains in the bed in the form of ferrophos due to the relatively high amount of iron found in matrix ore.

Since the carbon burnout is now at a low level the reduction of the phosphate in the balls can be allowed to take place at an optimum temperature which is sufficient to react the phosphate during the one hour dwell time in the hot zone of the kiln, but low enough to reduce the loss of sodium, potassium, fluorine, and sulfur to the freeboard while the phosphorus is removed from the kiln residue. Operation at this relatively low temperature, but over an extended length of the kiln, also gives high throughput, long refractory life, freedom from problems associated with melting in the kiln burden, and freedom from problems associated with sinoite formation in the kiln. The relatively low overall carbon burnout allows operation of the kiln with an oxidizing off gas so that an afterburner is avoided.

Thus, this IHP example provides a process wherein relatively cheap green petroleum coke provides the reactant and heat to produce high quality phosphoric acid product (68-76% $P_2O_5$) at the rate of 523,000 pounds $P_2O_5$ per hour from as mined matrix ore and to produce a kiln residue that is insoluble and can be used for landfill.

According to a further embodiment of the IHP, a phosphorous pentoxide producing method includes forming a kiln bed using feed agglomerates and, initially, from about 1 to about 2 wt % bedding coke or coal in a counter-current rotary kiln, the bed having a length and having a surface-to-volume ratio of less than about 1.15 $ft^2/ft^3$ and the kiln having an inner diameter of at least 6 feet. The agglomerates contain phosphate ore particles, carbonaceous material particles containing from about 8 to about 12 wt % volatiles, and sufficient silica particles for the agglomerates to exhibit a calcium-to-silica mole ratio of from 0.5 to less than 1.0, at least 80% of all particles exhibiting a size less than 200 mesh. Individual agglomerates substantially exhibit a same elemental composition, a same calcium-to-silica mole ratio, and a same proportion of excess fixed carbon at least 1.3 times a theoretical carbon requirement for reduction of all phosphate in the ore.

The method includes maintaining the bed surface-to-volume ratio with an inlet dam sufficiently tapered such that it reduces turbulence compared to otherwise identical processing with an untapered dam. The method also includes adding over bed air and/or oxygen through a plurality of ports along the bed length, the ports being of sufficient location, number, and throughput to decrease a time for bed heat up to 1180° C. compared to otherwise identical processing without the over bed air and/or oxygen. The method further includes maintaining a bed temperature at or above 1180° C. along at least 50% of the bed length without exceeding 1310° C. along the entire bed length. The method still further includes generating kiln off gas and collecting phosphorous pentoxide from the kiln off gas, the kiln discharging a residue containing processed agglomerates, less than 10% of the agglomerates' phosphate input to the kiln remaining in the residue as phosphate. By way of example, less than 5% of the input phosphate might remain in the residue. Calculation of the maximum surface-to-volume ratio for this embodiment of the IHP assumes a kiln length of 72 ft and a solids loading of 15%. Generally, the aspect ratio of the kiln may be about 12 or less (i.e., 6 ft diameter×12=72 ft). The various embodiments of the IHP herein may allow for a ratio as low as about 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A phosphorous pentoxide producing method comprising:
    forming green feed agglomerates from a homogeneous blend of water, lignin sulfonate, phosphate ore particles, carbonaceous material particles, and silica particles, the green agglomerates containing about 0.1 to 4 wt % lignin sulfonate;
    forming a reducing kiln bed using the feed agglomerates below an oxidizing freeboard of a counter-current rotary kiln, the bed having a length;
    the agglomerates containing the phosphate ore particles, the carbonaceous material particles, sufficient silica particles for the agglomerates to exhibit a calcium plus magnesium-to-silica mole ratio of less than 1.0, and the lignin sulfonate both inside the agglomerates and coating a surface of individual agglomerates;
    maintaining a bed temperature at or above 1180° C. along a portion of the bed length;
    generating freeboard particulates from the agglomerates, an amount of particulates generated being less than would occur in the method with no lignin sulfonate; and
    generating kiln off gas and collecting phosphorous pentoxide from the kiln off gas, the kiln discharging a residue containing processed agglomerates, less than 20% of the agglomerates' phosphate input to the kiln remaining in the residue, and the percentage of input phosphate that remains in the residue being less than would occur in the method with no lignin sulfonate.

2. The method of claim 1 wherein less than 10% of the agglomerates' phosphate input to the kiln remains in the residue and the calcium plus magnesium-to-silica mole ratio is less than 0.5.

3. The method of claim 1 further comprising controlling a drying rate of the green agglomerates and, as the water evaporates from the agglomerates, forming the lignin sulfonate coating on individual dried agglomerates by wicking some of the lignin sulfonate onto the surface of individual drying agglomerates without adhering the agglomerates together.

4. The method of claim 1 wherein the carbonaceous material particles comprise about 8 to 12 wt % volatiles and at least 80% of all particles exhibit a size less than 200 mesh.

5. A phosphorous pentoxide producing method comprising:
    forming a reducing kiln bed using feed agglomerates below an oxidizing freeboard of a counter-current rotary kiln, the bed having a length;
    the agglomerates containing phosphate ore particles, carbonaceous material particles, sufficient silica particles for the agglomerates to exhibit a calcium plus magnesium-to-silica mole ratio of less than 1.0, and a lignin sulfonate both inside the agglomerates and coating a surface of individual agglomerates, the lignin sulfonate coating having a thickness of about 1 to 50 micrometers and individual agglomerates containing a total of about 0.1 to 4 wt % lignin sulfonate including the coating;

maintaining a bed temperature at or above 1180° C. along a portion of the bed length;

generating freeboard particulates from the agglomerates, an amount of particulates generated being less than would occur in the method with no lignin sulfonate; and generating kiln off gas and collecting phosphorous pentoxide from the kiln off gas, the kiln discharging a residue containing processed agglomerates, less than 20% of the agglomerates' phosphate input to the kiln remaining in the residue, and the percentage of input phosphate that remains in the residue being less than would occur in the method with no lignin sulfonate.

6. A phosphorous pentoxide producing method comprising:

forming a reducing kiln bed using feed agglomerates below an oxidizing freeboard of a counter-current rotary kiln, the bed having a length;

the agglomerates containing phosphate ore particles, carbonaceous material particles, sufficient silica particles for the agglomerates to exhibit a calcium plus magnesium-to-silica mole ratio of less than 1.0, and a lignin sulfonate both inside the agglomerates and coating a surface of individual agglomerates, the lignin sulfonate inside the agglomerates exhibiting a continuously decreasing concentration gradient of lignin sulfonate from the surface into individual agglomerates, individual agglomerates comprising a total of about 0.1 to 4 wt % lignin sulfonate including the coating;

maintaining a bed temperature at or above 1180° C. along a portion of the bed length;

generating freeboard particulates from the agglomerates, an amount of particulates generated being less than would occur in the method with no lignin sulfonate; and generating kiln off gas and collecting phosphorous pentoxide from the kiln off gas, the kiln discharging a residue containing processed agglomerates, less than 20% of the agglomerates' phosphate input to the kiln remaining in the residue, and the percentage of input phosphate that remains in the residue being less than would occur in the method with no lignin sulfonate.

7. The method of claim 1 further comprising volatilizing at least a portion of the lignin sulfonate coating during bed heat up from about 650 to about 1180° C.

8. The method of claim 1 further comprising blanketing the bed with volatiles evolving at least partly from the lignin sulfonate during bed heat up from about 120 to about 650° C. and retaining a sacrificial layer of fixed carbon from the lignin sulfonate coating.

9. The method of claim 8 further comprising volatilizing at least a portion of the sacrificial layer during bed heat up from about 650 to about 1180° C.

10. A phosphorous pentoxide producing method comprising:

co-grinding a mixture containing phosphate ore, carbonaceous material, and silica;

homogeneously blending a lignin sulfonate with the co-ground mixture;

forming green feed agglomerates from the blended lignin sulfonate and co-ground mixture;

drying the green agglomerates and wicking some of the lignin sulfonate onto a surface of individual drying agglomerates, which forms a lignin sulfonate coating thereon, the dried agglomerates containing phosphate ore particles, carbonaceous material particles containing about 8 to 12 wt % volatiles, and sufficient silica particles for the dried agglomerates to exhibit a calcium plus magnesium-to-silica mole ratio of less than 0.5 and at least 80% of all particles exhibiting a size less than 200 mesh, the lignin sulfonate coating having a thickness of about 1 to 50 micrometers and a remainder of the lignin sulfonate exhibiting a continuously decreasing concentration gradient of lignin sulfonate from the surface into individual agglomerates, individual agglomerates comprising a total of about 0.1 to 4 wt % lignin sulfonate including the coating;

forming a reducing kiln bed using the dried agglomerates below an oxidizing freeboard of a counter-current rotary kiln, the bed having a length;

blanketing the bed with volatiles evolving at least partly from the lignin sulfonate during bed heat up from about 120 to about 650° C. and retaining a sacrificial layer of fixed carbon from the lignin sulfonate coating;

volatilizing at least a portion of the sacrificial layer during bed heat up from about 650 to about 1180° C.;

maintaining a bed temperature at or above 1180° C. along a portion of the bed length; and generating kiln off gas and collecting phosphorous pentoxide from the kiln off gas, the kiln discharging a residue containing processed agglomerates, less than 10% of the agglomerates' phosphate input to the kiln remaining in the residue.

11. The method of claim 10 wherein the homogeneous blend of lignin sulfonate and the co-ground mixture further includes water and the drying comprises controlling a drying rate of the green agglomerates and, as the water evaporates from the agglomerates, forming the lignin sulfonate coating on individual dried agglomerates by wicking some of the lignin sulfonate onto the surface of individual drying agglomerates without adhering the agglomerates together.

12. The method of claim 10 wherein the green feed agglomerates comprise green feed balls exhibiting a greater than ¼ to less than ½ inch diameter prior to drying and the dried feed balls exhibit a dry crush strength greater than 25 pounds.

13. The method of claim 10 wherein the lignin sulfonate coating has a thickness of about 10 to 40 micrometers and the individual agglomerates comprise a total of about 0.4 to 2 wt % lignin sulfonate, including the coating.

14. The method of claim 10 further comprising generating freeboard particulates from the phosphate ore particles, an amount of particulates generated being less than would occur in the method with no lignin sulfonate.

15. The method of claim 10 wherein the percentage of input phosphate that remains in the residue is less than would occur in the method with no lignin sulfonate.

16. The method of claim 5 wherein less than 10% of the agglomerates' phosphate input to the kiln remains in the residue, the calcium plus magnesium-to-silica mole ratio is less than 0.5, and the carbonaceous material particles comprise about 8 to 12 wt % volatiles and at least 80% of all particles exhibit a size less than 200 mesh.

17. The method of claim 5 further comprising volatilizing at least a portion of the lignin sulfonate coating during bed heat up from about 650 to about 1180° C.

18. The method of claim 5 further comprising blanketing the bed with volatiles evolving at least partly from the lignin sulfonate during bed heat up from about 120 to about 650° C., retaining a sacrificial layer of fixed carbon from the lignin sulfonate coating, volatilizing at least a portion of the sacrificial layer during bed heat up from about 650 to about 1180° C.

19. The method of claim 6 wherein less than 10% of the agglomerates' phosphate input to the kiln remains in the residue, the calcium plus magnesium-to-silica mole ratio is less than 0.5, and the carbonaceous material particles comprise about 8 to 12 wt % volatiles and at least 80% of all particles exhibit a size less than 200 mesh.

20. The method of claim 6 further comprising volatilizing at least a portion of the lignin sulfonate coating during bed heat up from about 650 to about 1180° C.

21. The method of claim 6 further comprising blanketing the bed with volatiles evolving at least partly from the lignin sulfonate during bed heat up from about 120 to about 650° C., retaining a sacrificial layer of fixed carbon from the lignin sulfonate coating, volatilizing at least a portion of the sacrificial layer during bed heat up from about 650 to about 1180° C.

* * * * *